(12) United States Patent
Bansal et al.

(10) Patent No.: US 12,101,318 B2
(45) Date of Patent: Sep. 24, 2024

(54) ADAPTIVE MULTIPATH TUNNELING IN CLOUD-BASED SYSTEMS

(71) Applicant: Zscaler, Inc., San Jose, CA (US)

(72) Inventors: Abhinav Bansal, Milpitas, CA (US); Rohit Goyal, Malout (IN)

(73) Assignee: Zscaler, Inc., San Jose, CA (US)

( * ) Notice: Subject to any disclaimer, the term of this patent is extended or adjusted under 35 U.S.C. 154(b) by 262 days.

(21) Appl. No.: 17/101,531

(22) Filed: Nov. 23, 2020

(65) Prior Publication Data

US 2021/0105275 A1    Apr. 8, 2021

Related U.S. Application Data

(63) Continuation-in-part of application No. 16/922,353, filed on Jul. 7, 2020, now Pat. No. 11,533,307, which
(Continued)

(30) Foreign Application Priority Data

Mar. 28, 2016 (IN) .............................. 201611010521
May 21, 2020 (IN) .............................. 202011021372
Oct. 9, 2020 (IN) .............................. 202011044117

(51) Int. Cl.
*H04L 9/40* (2022.01)
*H04L 61/4511* (2022.01)
*H04L 67/02* (2022.01)
*H04L 67/10* (2022.01)
*H04L 67/1001* (2022.01)
(Continued)

(52) U.S. Cl.
CPC ...... *H04L 63/0884* (2013.01); *H04L 61/4511* (2022.05); *H04L 63/0272* (2013.01); *H04L 63/0281* (2013.01); *H04L 67/02* (2013.01); *H04L 67/10* (2013.01); *H04L 67/1001* (2022.05); *H04L 67/125* (2013.01); *H04L 67/51* (2022.05); *H04L 67/56* (2022.05);
(Continued)

(58) Field of Classification Search
CPC ..... H04L 63/0884; H04L 67/51; H04L 67/56; H04L 61/4511; H04L 63/0272; H04L 63/0281; H04L 67/02; H04L 67/10; H04L 67/125
See application file for complete search history.

(56) References Cited

U.S. PATENT DOCUMENTS 7,693,059 B2    4/2010    Osenbach et al.
8,695,059 B2    4/2014    Kopti
(Continued)

*Primary Examiner* — Harris C Wang
(74) *Attorney, Agent, or Firm* — Baratta Law PLLC; Lawrence A. Baratta, Jr.; Ryan Odessa

(57) ABSTRACT

Systems and methods implemented by a mobile device include establishing a plurality of tunnels to a gateway, wherein each of the plurality of tunnels is on one of a plurality of link layer channels at the mobile device; intercepting network traffic on the mobile device; forwarding the network traffic to one of the plurality of tunnels based on a set of traffic forwarding rules; and responsive to a network change for the mobile device, managing the plurality of tunnels and continuing the forwarding based on the managing. The systems and methods can further include determining characteristics including bandwidth of each of the plurality of link layer channels; and utilizing the characteristics with the set of traffic forwarding rules for the forwarding.

17 Claims, 18 Drawing Sheets

Related U.S. Application Data is a continuation-in-part of application No. 15/900,951, filed on Feb. 21, 2018, now Pat. No. 10,986,094, which is a continuation of application No. 15/153,108, filed on May 12, 2016, now Pat. No. 9,935,955.

(51) Int. Cl.
*H04L 67/125* (2022.01)
*H04L 67/51* (2022.01)
*H04L 67/56* (2022.01)
*H04L 67/563* (2022.01)
*H04L 67/564* (2022.01)
*H04L 69/16* (2022.01)
*H04L 101/663* (2022.01)

(52) U.S. Cl.
CPC .......... *H04L 67/563* (2022.05); *H04L 67/564* (2022.05); *H04L 69/162* (2013.01); *H04L 2101/663* (2022.05)

(56) References Cited

U.S. PATENT DOCUMENTS

| | | |
|---|---|---|
| 9,019,962 B1 | 4/2015 | Ghosh |
| 9,621,574 B2 | 4/2017 | Desai et al. |
| 9,935,955 B2 | 4/2018 | Desai et al. |
| 10,044,719 B2 | 8/2018 | Desai et al. |
| 10,225,740 B2 | 3/2019 | Bansal et al. |
| 10,243,997 B2 | 3/2019 | Desai et al. |
| 10,432,673 B2 | 10/2019 | Bansal et al. |
| 10,511,607 B2 | 12/2019 | Bansal et al. |
| 10,574,652 B2 | 2/2020 | Desai et al. |
| 10,630,724 B2 | 4/2020 | Bansal et al. |
| 10,708,233 B2 | 7/2020 | Goyal et al. |
| 2005/0185587 A1* | 8/2005 | Klinker ............... H04L 61/2525 370/235 |
| 2007/0280243 A1* | 12/2007 | Wray .................. H04L 12/4633 370/392 |
| 2009/0176493 A1* | 7/2009 | Yokota ............. H04W 36/0066 455/436 |
| 2010/0027549 A1 | 2/2010 | Satterlee et al. |
| 2010/0125903 A1 | 5/2010 | Devarajan et al. |
| 2012/0281706 A1 | 11/2012 | Agarwal et al. |
| 2013/0061306 A1 | 3/2013 | Sinn |
| 2014/0007222 A1* | 1/2014 | Qureshi .................. H04L 67/10 726/16 |
| 2014/0020062 A1 | 1/2014 | Tumula et al. |
| 2015/0009995 A1* | 1/2015 | Gross, IV ........... H04L 12/4633 370/392 |
| 2015/0135302 A1 | 5/2015 | Cohen et al. |
| 2015/0282041 A1 | 10/2015 | Batchu et al. |
| 2016/0142374 A1 | 5/2016 | Clark |
| 2016/0295477 A1* | 10/2016 | Zhu .................. H04W 36/1446 |
| 2016/0337104 A1* | 11/2016 | Kalligudd ........... H04W 12/033 |
| 2017/0279803 A1 | 9/2017 | Desai et al. |
| 2017/0331859 A1 | 11/2017 | Bansal et al. |
| 2018/0288062 A1 | 10/2018 | Goyal et al. |
| 2020/0067949 A1 | 2/2020 | Bansal et al. |
| 2020/0077265 A1 | 3/2020 | Singh et al. |

* cited by examiner

ADAPTIVE MULTIPATH TUNNELING IN CLOUD-BASED SYSTEMS

CROSS-REFERENCE TO RELATED APPLICATION(S)

The present patent application/patent is a continuation-in-part of U.S. patent application Ser. No. 16/922,353, filed Jul. 7, 2020, and entitled "Enforcing security policies on mobile devices in a hybrid architecture," which claims the benefit of priority of Indian Patent Application No. 202011021372, filed on May 21, 2020, and entitled "Enforcing security policies on mobile devices in a hybrid architecture," the contents of each are incorporated by reference herein in their entirety.

Also, the present patent application/patent is a continuation-in-part of U.S. patent application Ser. No. 15/900,951, filed Feb. 21, 2018, and entitled "SYSTEMS AND METHODS FOR CLOUD BASED UNIFIED SERVICE DISCOVERY AND SECURE AVAILABILITY," which is a continuation of U.S. patent application Ser. No. 15/153,108, filed May 12, 2016 (now U.S. Pat. No. 9,935,955, issued Apr. 3, 2018) and entitled "SYSTEMS AND METHODS FOR CLOUD BASED UNIFIED SERVICE DISCOVERY AND SECURE AVAILABILITY," which claims the benefit of priority of Indian Patent Application No. 201611010521, filed on Mar. 28, 2016, and entitled "SYSTEMS AND METHODS FOR CLOUD BASED UNIFIED SERVICE DISCOVERY AND SECURE AVAILABILITY," the contents of each are incorporated by reference herein in their entirety.

FIELD OF THE DISCLOSURE

The present disclosure generally relates to computer networking systems and methods. More particularly, the present disclosure relates to systems and methods for adaptive multipath tunneling in cloud-based systems.

BACKGROUND OF THE DISCLOSURE

There has been an explosive growth of mobile device usage in enterprises. Traditionally enterprises deployed Secure Sockets Layer (SSL)/Internet Protocol (IP) Security (IPSec) Virtual Private Networks (VPNs)/proxies to steer traffic from mobile devices to a centralized, secure gateway which was used to provide resource access to users in addition to performing various cloud-based functions, e.g., web filtering, security scans, Data Loss Prevention (DLP), etc., on the network traffic for policy compliance and protection from malware. Over the years, as more and more people have started working from home, this backhauling all of all user traffic from a mobile device to the centralized gateway has caused a serious performance and scalability challenges. Further, mobile devices have limited resources and operate under several constraints, such as battery utilization that makes traditional SSL and IPSec VPN solutions expensive to operate. Usually, mobile devices can hop quickly from one network to another, such as between cellular and Wi-Fi that quite often require the whole VPN tunnel to tear down and get reestablished again, which often causes loss of network access resulting in bad user experience. This is hugely inefficient in terms of server and client processing power as it wastes a lot of resources to reestablish secure network connectivity.

BRIEF SUMMARY OF THE DISCLOSURE

The present disclosure relates to systems and methods for adaptive multipath tunneling in cloud-based systems. Specifically, the present disclosure describes a performance-based adaptive multipath tunneling solution for mobile devices to connect to cloud-based systems, such as for security, secure application access, etc. The tunnels are established independently on multiple available paths to maximize resource usage and increase redundancy. This solution is inspired by multipath Transmission Control Protocol (TCP) (RFC 6824, "TCP Extensions for Multipath Operation with Multiple Address," January 2013, the contents of which are incorporated by reference) and applies the principles of using multiple channels for communication for VPN tunnels without relying on the multipath TCP original design of splitting TCP communication flow between client and server applications over multiple channels that usually suffers from issues with Network Address Translation (NAT) traversals and network scanning devices. The adaptive multipath tunneling supports increased throughput to the sum of all available link-level channels, support for prioritized network traffic and preemption, fault tolerance, and compatibility with existing networking devices.

In various embodiments, the present disclosure includes a method with steps, a mobile device node configured to implement the steps, and a non-transitory computer-readable medium storing computer-executable instructions for causing performance of the steps on a mobile device. The steps include establishing a plurality of tunnels to a gateway, wherein each of the plurality of tunnels is on one of a plurality of link layer channels at the mobile device; intercepting network traffic on the mobile device; forwarding the network traffic to one of the plurality of tunnels based on a set of traffic forwarding rules; and responsive to a network change for the mobile device, managing the plurality of tunnels and continuing the forwarding based on the managing. The steps can further include determining characteristics including bandwidth of each of the plurality of link layer channels; and utilizing the characteristics with the set of traffic forwarding rules for the forwarding. The steps can further include configuring the application with the set of traffic forwarding rules. The set of traffic forwarding rules can include a tuple of address or domain, assigned priority, and address of the gateway. Each of the plurality of tunnels can be a lightweight tunnel that is Hypertext Transfer Protocol (HTTP)-based. The intercepting can be via one of a virtual interface and a network filter. The plurality of link layer channels can include a wireless cellular channel and a Wi-Fi channel. The managing can include adding or removing tunnels based the network change. The forwarding can include forwarding traffic to all of the plurality of tunnels concurrently.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

Figure 1:
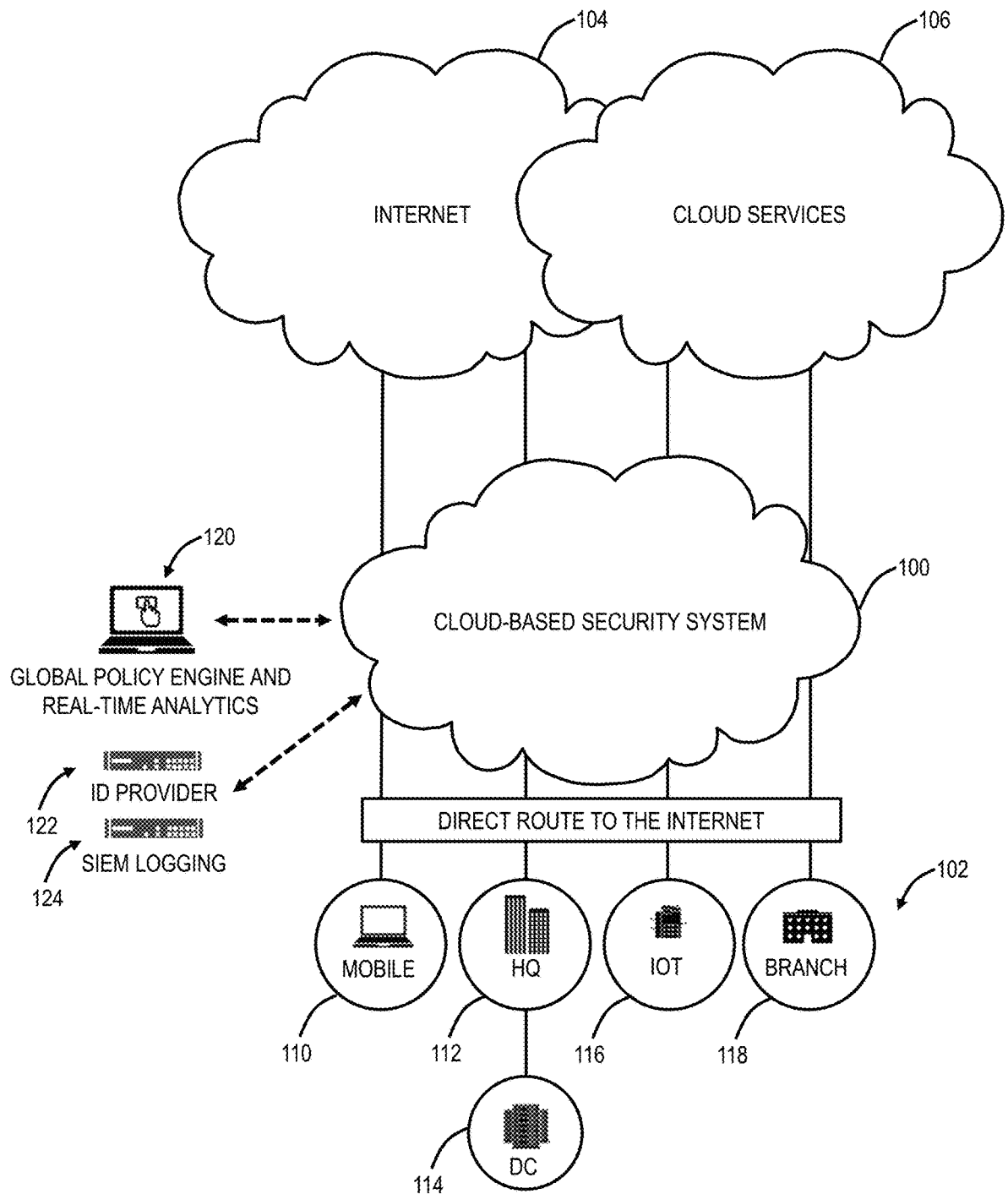
FIG. 1 is a network diagram of a cloud-based system offering security as a service.

Again, the present disclosure relates to systems and methods for adaptive multipath tunneling in cloud-based systems. Specifically, the present disclosure describes a performance-based adaptive multipath tunneling solution for mobile devices to connect to cloud-based systems, such as for security, secure application access, etc. The tunnels are established independently on multiple available paths to maximize resource usage and increase redundancy. This solution is inspired by multipath Transmission Control Protocol (TCP) (RFC 6824, "TCP Extensions for Multipath Operation with Multiple Address," January 2013, the contents of which are incorporated by reference) and applies the principles of using multiple channels for communication for VPN tunnels without relying on the multipath TCP original design of splitting TCP communication flow between client and server applications over multiple channels that usually suffers from issues with Network Address Translation (NAT) traversals and network scanning devices. The adaptive multipath tunneling supports increased throughput to the sum of all available link-level channels, support for prioritized network traffic and preemption, fault tolerance, and compatibility with existing networking devices.

Additionally, the present disclosure relates to systems and methods for service-driven split tunneling of mobile network traffic. The systems and methods include an app or agent on a user device (e.g., a mobile device) which performs split tunneling based upon port, protocol, and destination IP address instead of just destination IP. This provides granular controls to IT administrators to steer a user's network traffic based upon the demands of the service. This is very advantageous from a scalability point of view as the demands for a particular service grow, that traffic can be individually distributed, load-balanced, and served without impacting traffic of other services. This form of split tunneling also allows for efficient usage of resources both on the end user's device as well as backend concentrators. For instance, if all traffic, including Hypertext Transfer Protocol (HTTP) and HTTP Secure (HTTPS), is tunneled via an SSL VPN, there is an overhead of decrypting SSL traffic twice, one for the transport and the other for the application itself. While splitting traffic based upon the protocol, the HTTPS transport can go unencrypted since the HTTPS traffic itself is encrypted. This saves both the client and the avoiding encryption and decryption twice, saving a significant amount of computational power on all ends.

Another benefit of this form of split tunneling is that it takes into account the quality of service requirements for different protocols. For example, in a conventional VPN, all VOIP and UDP traffic will be tunneled over an SSL VPN with all other TCP traffic as well. Since all these protocols have different service requirements, the traditional VPN generally underperforms and is difficult to scale. With this service-driven split tunneling, VOIP over UDP traffic can be tunneled separately to a specific UDP traffic concentrator that is designed for handling large volumes of such traffic. In this case, VOIP traffic does not need to fight with other protocols through its intended destination. In another use case, an admin may altogether decide not to tunnel VOIP traffic and go directly from the user's device. Note that this kind of granularity is not possible with split tunneling based upon destination IP address alone. The service-driven split tunneling further allows for on-demand embarking (or disembarking) of particular network traffic, i.e., whenever the IT infrastructure is ready to support a new protocol, the agent can start (or stop) tunneling that traffic based upon the configured rules.

Further, the present disclosure relates to systems and methods for cloud-based unified service discovery and secure availability. The systems and methods enable a user to connect to multiple cloud services through the dynamic discovery of available services, followed by authentication and access as exposed in the corresponding service protocol. The systems and methods address the unmanageable growth of mobility and cloud-based services, which have led to a proliferation of individual applications for access to individual services. The systems and method can be implemented through a mobile application ("app"), which overcomes the hassle of deploying and managing several applications across a gamut of mobile devices, operating systems, and mobile networks to gain secure access to the cloud-based Internet or intranet resources. The mobile application can uniquely perform a Dynamic evaluation of Network and Service Discovery, Unified Enrollment to all services, application-dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end user, followed by authentication and access to individual services.

Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user in all of those services. It will then set up secure tunnels for each service depending upon the port, protocol, and intended destination of requested traffic.

The mobile app will also discover all applications provided within the enterprise cloud along with a Global VPN (GVPN) service and show the available services to end users. Endpoint Applications today provide one service for a specific network function (such as a VPN to a corporate network, web security, antivirus to access the Internet). The mobile app can be used to enable all these services with single enrollment. The mobile app will provide services to darknet applications along with securing the Internet traffic. The mobile app can set up a local network on the mobile device.

Example Cloud-Based System Architecture

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
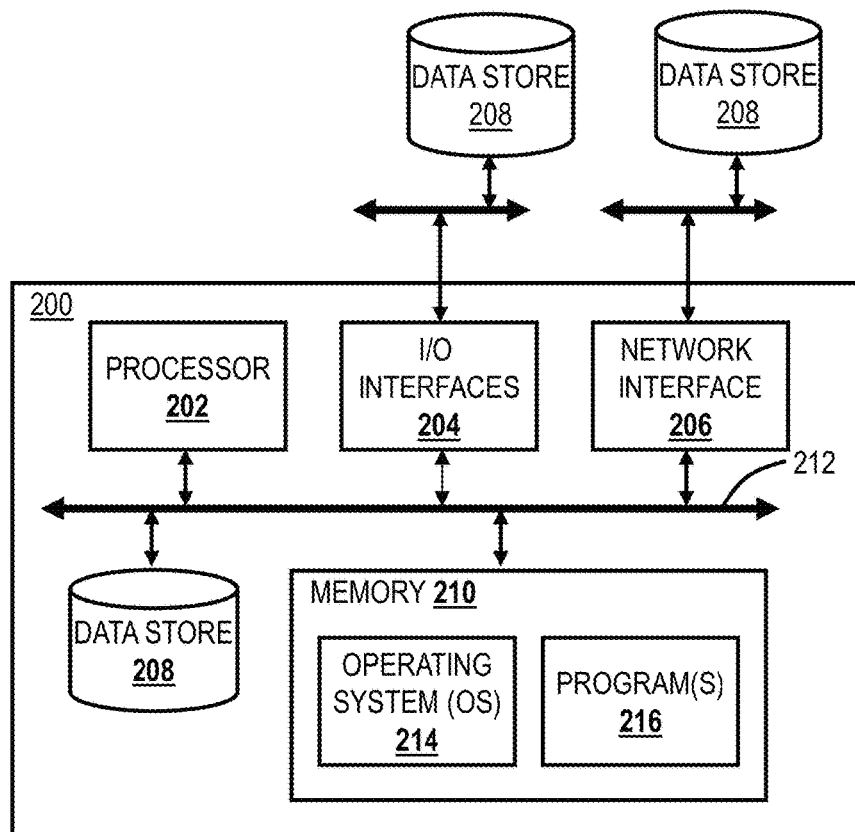

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118, can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118, can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
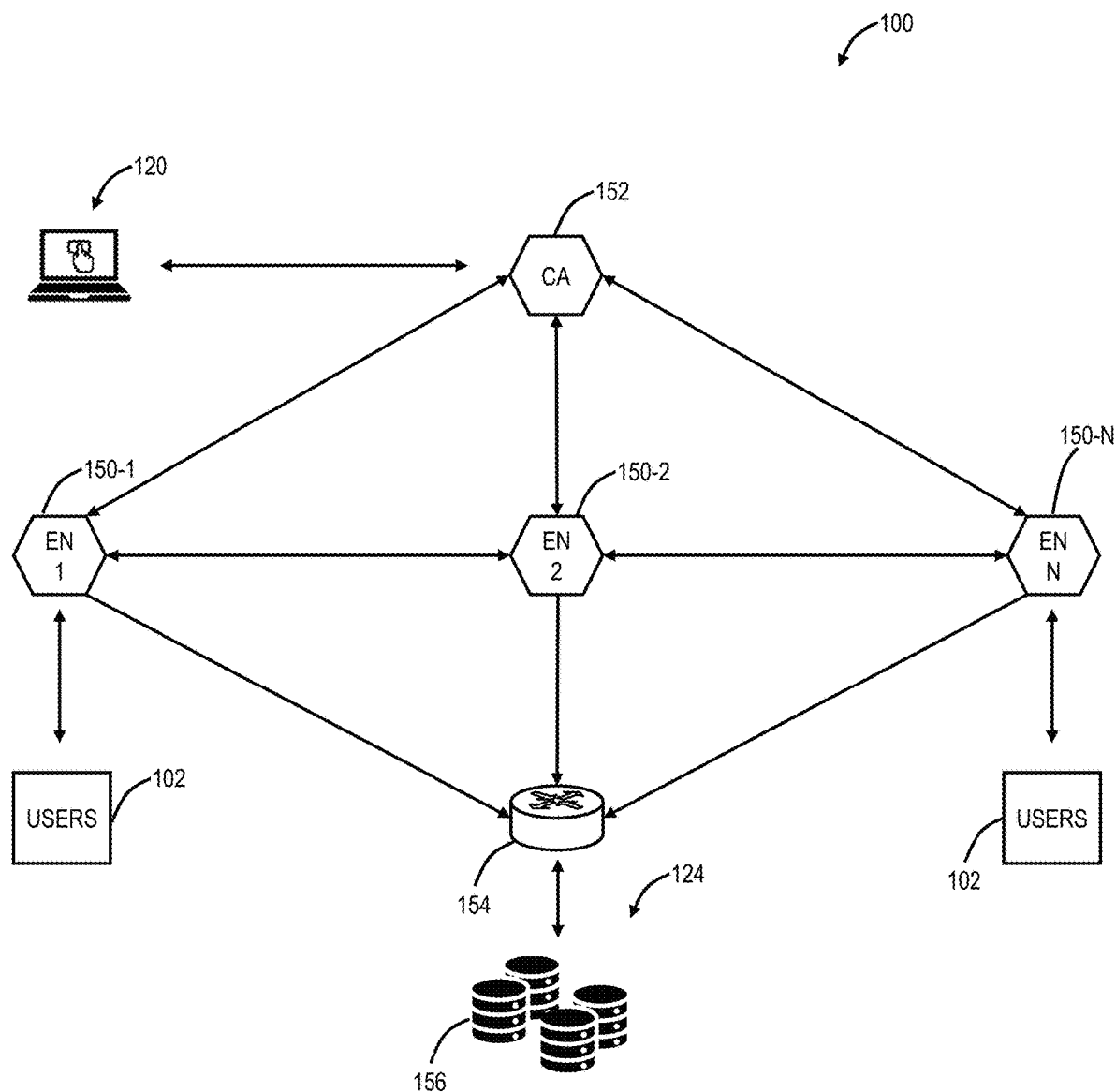
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is process through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
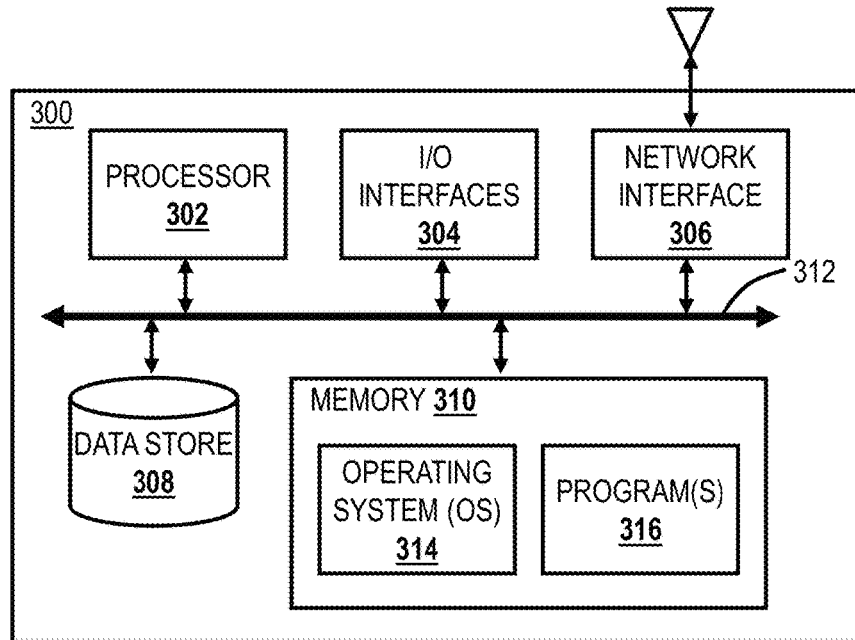

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

The present disclosure relates to mobile devices, which are one subset of the user device 300. Specifically, the user device 300 as a mobile device can change network connectivity periodically, e.g., switching between cellular and Wi-Fi, and the mobile device has processing limitations, mainly due to battery optimization.

User Device Application for Traffic Forwarding and Monitoring

Figure 5:
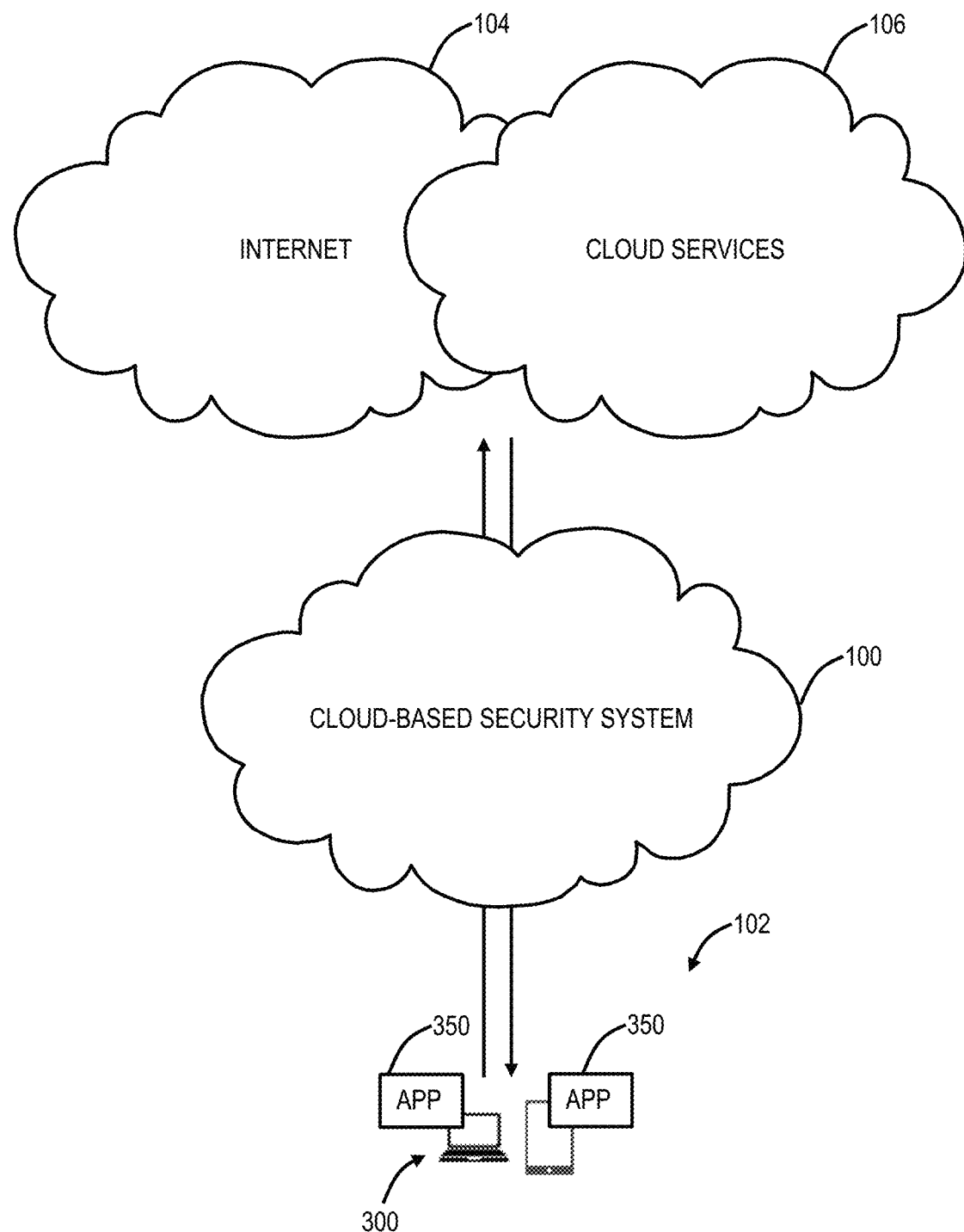
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figure 6:
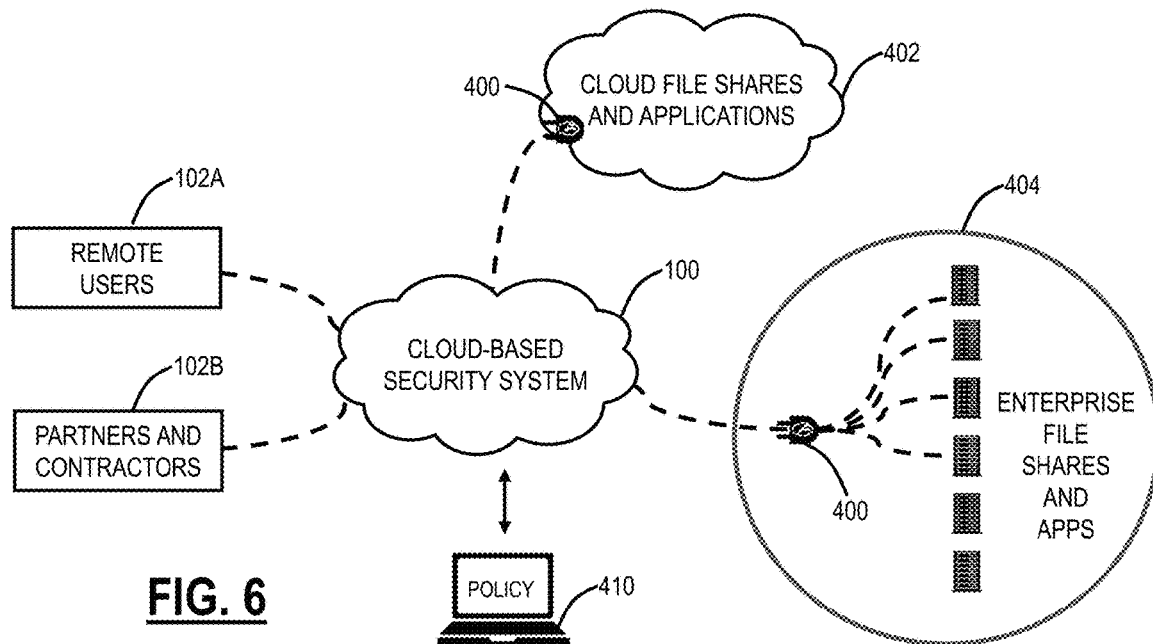
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 404, connected to enterprise file shares and applications. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy 410, and the cloud-based system 100 to stitch the applications 402, 404 and the software connectors 400 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises. FIG. 5 can include the ZPA service from Zscaler, Inc.

Digital Experience Monitoring

Figure 7:
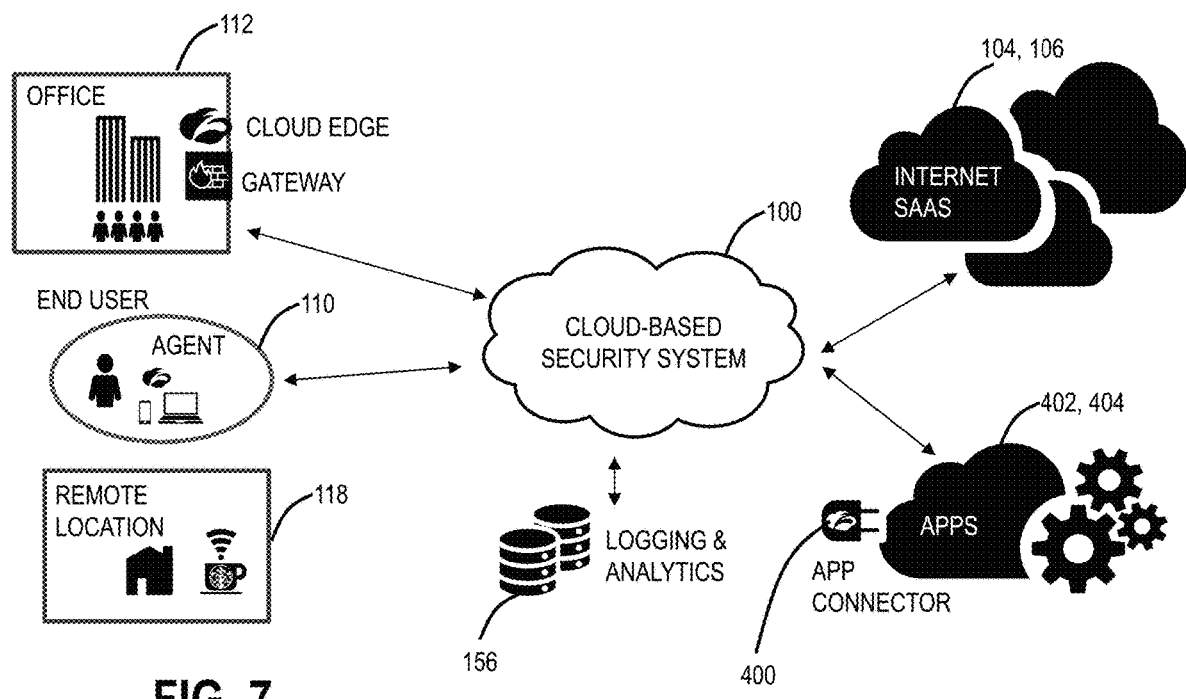
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10 G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Unified Agent Application

Figure 8:
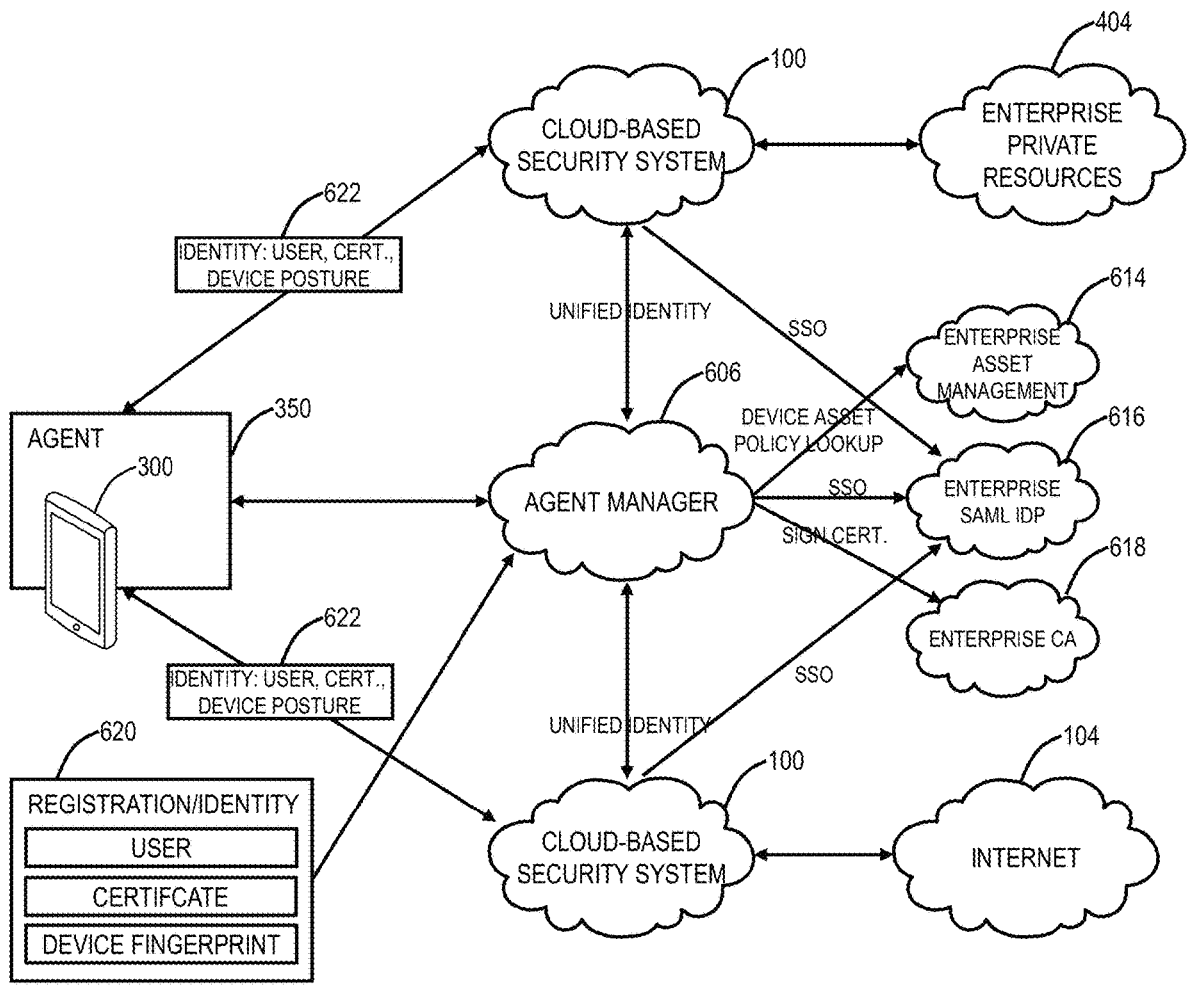
FIG. 8 is a network diagram of a unified agent application and associated connectivity and functionality with the cloud-based system.

FIG. 8 is a network diagram of the use of the application 350 as a unified agent application and associated connectivity and functionality with the cloud-based system 100. Again, the unified agent application 350 is executed on a user device 300. The unified agent application 350 dynamically learns all available services, adapts to changing network environments, and provides a seamless and secure network resource access to Internet and darknet hosted applications. This is achieved through dynamic evaluation of network conditions, enrollment to individual services, learning individual service protocols, creating a link-local network on the user device 300, and establishing multiple secure tunnels to cloud services over this local network.

The unified agent application 350 is communicatively coupled to an agent manager cloud 606, as well as the cloud-based system 100. The unified agent application 350 enables communication to enterprise private resources on the enterprise network 404 via the cloud-based system 100 and to the Internet 104 via the cloud-based system 100. The agent manager cloud 606 can communicate with enterprise asset management 614, an enterprise Security Assertion Markup Language (SAML) Identity Provider (IDP) 616, and an enterprise Certificate Authority (CA) 618. The user device 300 and the unified agent application 350 can perform a registration/identity 620 process through the agent manager cloud 606 where the user identity, the user's certificates, and a device fingerprint can uniquely identify the user device 300. Once registered, the unified agent application 350 has an identity 622, which can include the user, certificates, device posture, etc. and which is shared with the cloud-based system 100.

The unified agent application 350 operates on a client-server model where an IT admin enables appropriate services for end users at a Cloud Administration Server (CAS), which can be part of the agent manager cloud 606, namely the enterprise asset management 614. Every client can make a unicast request to the agent manager cloud 606 (e.g., CAS) to discover all enabled services. On acknowledging the response, the client issues a request to authenticate to each service's cloud Identity Providers, the enterprise SAML IDP 616. Authentication can be multi-factor depending upon the nature of the service. On successful authentication, the server contacts Mobile Device Management (MDM) or Inventory management provider to define access control rights for the user device 300. Post authorization, the user device 300 is successfully enrolled in the agent manager cloud 606, which tracks and monitors all behavior of the user device 300.

Post-enrollment, the user device 300 creates a link local network with a specific IP configuration, opens a virtual network interface to read and write packets to create secure tunnels to available services through the cloud-based system 100. On network changes, the user device 300 dynamically evaluates reachability to pre-configured domains and depending upon the result, it appropriately transitions all network tunnels, thus providing a seamless experience to the end user. Further, the user device 300 also intelligently learns the conditions which are appropriate for setting up network tunnels to cloud services depending upon several network heuristics such as reachability to a particular cloud service.

Unified Agent Application–Functionality

Generally, the unified agent application 350 supports two broad functional categories—1) dynamic service discovery and access controls and 2) service availability. The dynamic service discovery and access controls include service configuration by the administrator, service discovery by the user device 300, service acknowledgment and authentication, service authorization and enrollment, and the like. For service configuration by the administrator, the IT admin can provide cloud service details at a centralized knowledge server, such as part of the agent manager cloud 606, the enterprise asset management 614, etc. The cloud service details include the service type (e.g., Internet/intranet), network protocol, identity provider, server address, port, and access controls, etc.

For service discovery by the user device 300, the user device 300 can issue a network request to a known Cloud Administrative Server (CAS) in the agent manager cloud 606 to discover all enabled services for a user. If a specific cloud server is not known a priori, the user device 300 can broadcast the request to multiple clouds, e.g., through the agent manager cloud 606 communicating to the enterprise asset management 614, the enterprise SAML IDP 616, and the enterprise CA 618.

For the service acknowledgment and authentication, the user device 300 acknowledges the response of service discovery and initiates the authentication flow. The user device 300 learns the authentication protocol through the service discovery configuration and performs authentication of a configured nature at the enterprise SAML IDP 616. For the service authorization and enrollment, post successful authentication, the CAS authorizes the user device 300, and fetches the access control information by contacting an MDM/Inventory Solutions Provider. Depending upon the user context and the nature of access, the CAS enrolls the user device 300 into several cloud services and informs the cloud services that the user has been enrolled for access.

The service availability includes link local network setup, a traffic interceptor, and dynamic traffic forwarding tunnels to authorized services. The link-local network setup, post-enrollment, has the user device 300 create a local network on the user device 300 itself to manage various networking functionalities. For the traffic interceptor, the user device 300 intercepts and evaluates all Internet traffic. Allowed traffic is tunneled to the cloud services such as in the cloud-based system 100, whereas the rest of the traffic is denied as per enterprise policies. For the dynamic traffic forwarding tunnels to authorized services, depending upon the evaluation, the user device 300 splits the traffic into the different tunnel to individual cloud services such as in the cloud-based system 100.

The unified agent application 350 is a single application that provides secure connectivity to the Internet 104 and darknet hosted applications, such as the enterprise private resources in the enterprise network 404. The unified agent application 350 communicates securely to the agent manager cloud 606, which is controlled by an IT admin. The unified agent application 350 learns available services and authenticates with each service. Post proper enrollment, the unified agent application 350 securely connects to cloud services by means of network tunnels.

Unified Agent Application—Workflow

Figure 9:
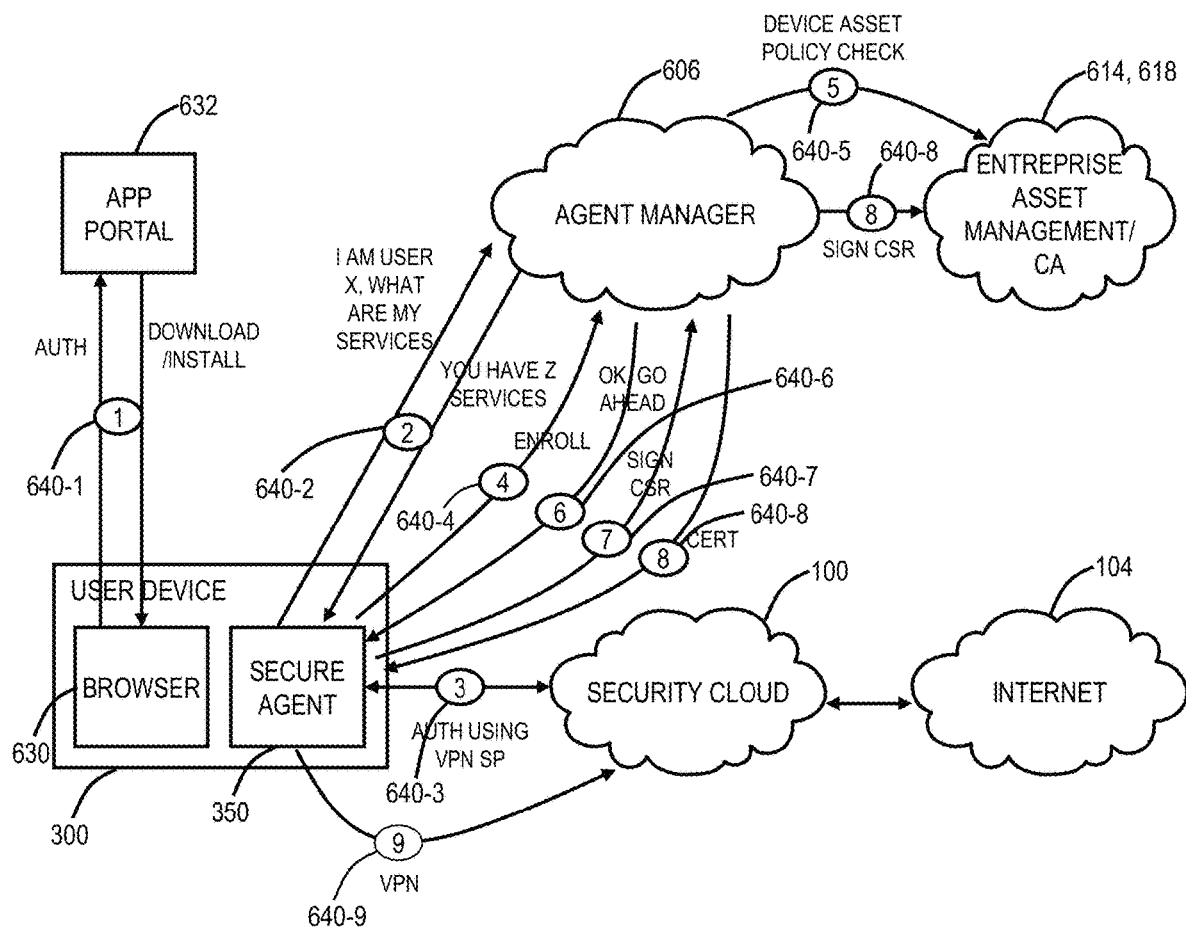
FIG. 9 is a network diagram of example workflow of the unified agent application.

FIG. 9 is a network diagram of the example workflow of the unified agent application 350. The user device 300 again executes the unified agent application 350, as well as a browser 630 (or some other application requesting network services). First, the user device 300 includes authentication through an application portal 632 and download/install of the unified agent application 350 therefrom (step 640-1). Note, the application portal 632 can be a website, Apple's app store, Google Play, Windows Store, etc. Once installed, the unified agent application 350 communicates to the agent manager cloud 606, communicating identity and asking for available services ("I am User X, what are my services?") and the agent manager cloud 606 responds with the available services ("You have Z services") (step 640-2).

Next, the unified agent application 350 includes authentication using a VPN Service Provider (SP) with the security cloud 608 (step 640-3). The unified agent application 350 next enrolls the user device 300 through the agent manager cloud 606 (step 640-4). The agent manager cloud 606 performs a device asset policy check with the enterprise asset management 614 (step 640-5). The agent manager cloud 606, upon the successful check, provides the unified agent application 350 an affirmative response (step 640-6). The unified agent application 350 sends a Certificate Signing Request (CSR) to the agent manager cloud 606 (step 640-7), and the agent manager cloud 606 sends the CSR request to the enterprise CA, and the certificate is returned to the unified agent application 350 (step 640-8). Finally, the unified agent application 350 enables VPN connectivity to the security cloud 608 (step 640-9).

Figure 10:
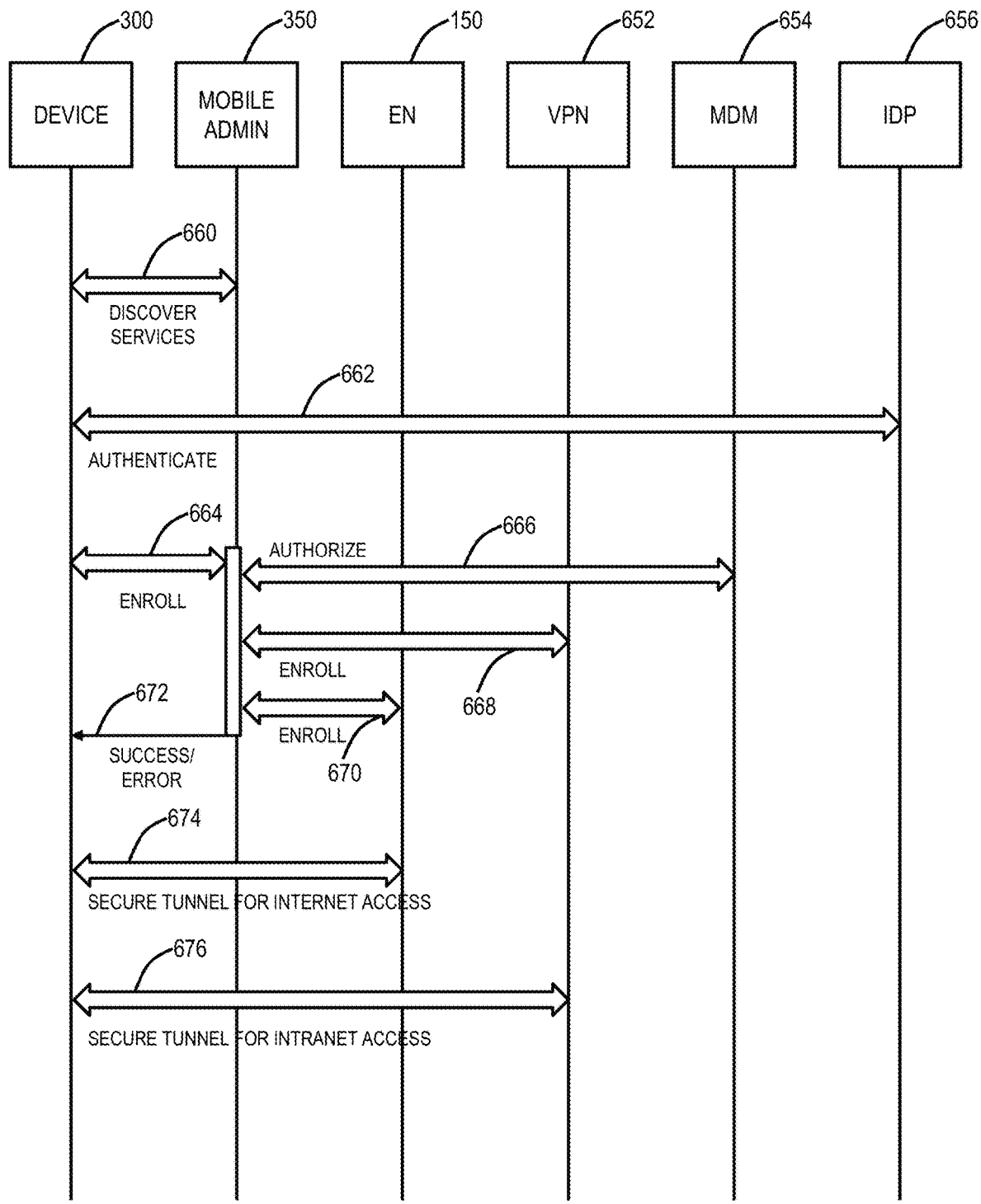
FIG. 10 is a flow diagram of an event sequence associated with the unified agent application.

FIG. 10 is a flow diagram of an event sequence associated with the unified agent application 350. The event sequence is shown between the user device 300 executing the unified agent application 350, a mobile admin function 650 such as implemented through the agent manager cloud 606, an enforcement node 150, a VPN node 652 such as through the security cloud 608, an MDM function 654 such as through the enterprise asset management 614, and an IDP function 656 such as through the enterprise SAML IDP 616. The user device 300 discovers services with the mobile admin function 650 (step 660), and the user device 300 is authenticated by the IDP function 656 (step 662). The user device 300 enrolls in discovered services through the mobile admin function 650 (step 664).

The mobile admin function 650 is configured to authorize the services with the MDM function 654 (step 666), enroll in the services through the VPN node 652 (step 668), and the enforcement nodes 150 (step 670). A success/error is provided by the mobile admin function 650 to the user device 300 (step 672). Subsequently, the user device 300, through the unified agent application 350, accesses the services such as a secure tunnel for internet access through the enforcement nodes 150 (step 674) or a secure tunnel for intranet access through the VPN node 652 (step 676).

Unified Agent Application—Architecture

Figure 11:
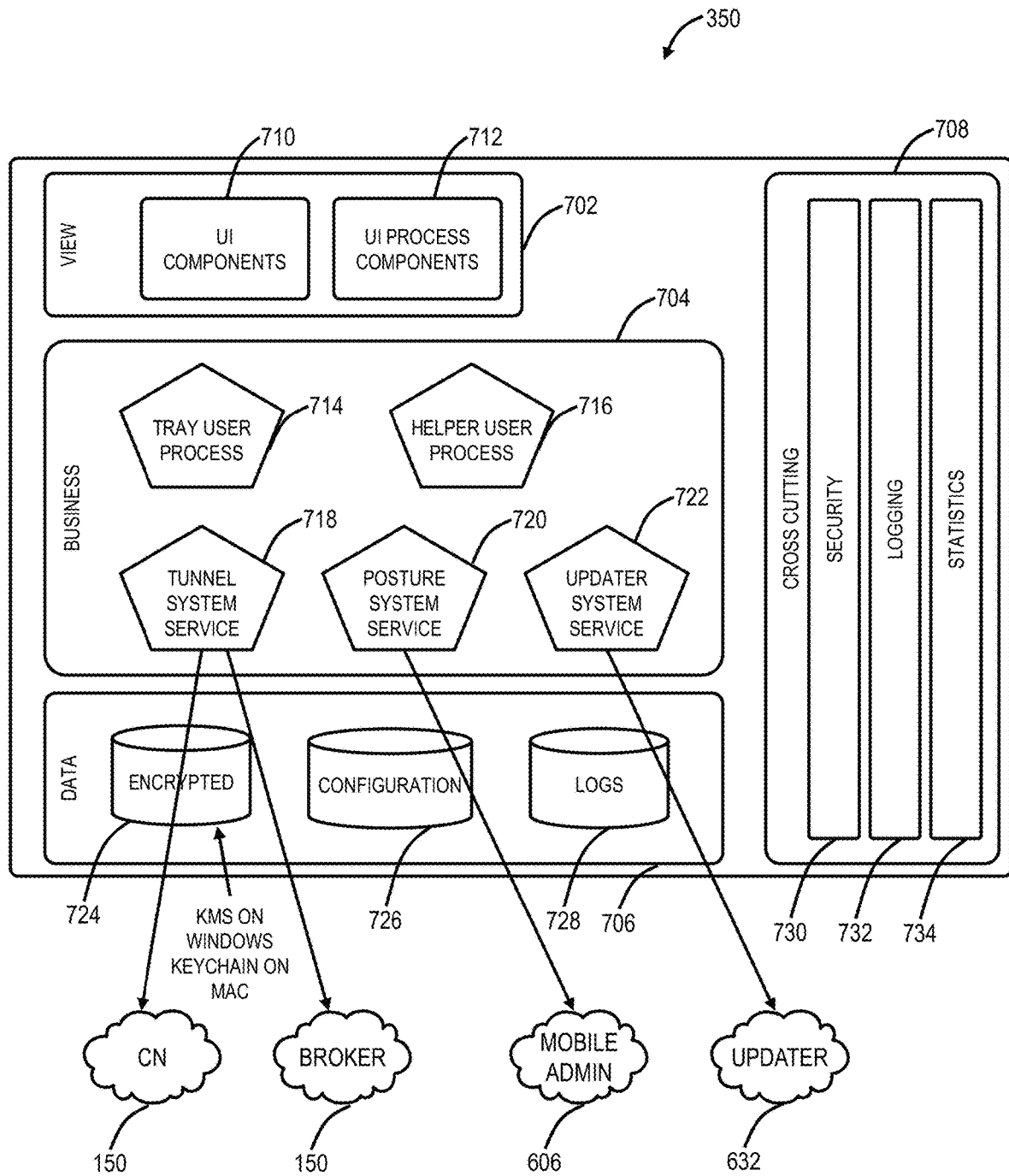
FIG. 11 is a logical diagram of functional components of the unified agent application.

FIG. 11 is a logical diagram of the functional components of the unified agent application 350. The unified agent application 350 is configured to operate on the mobile user device 300. The cloud-based system 100 can provide Internet security as well as cloud-based remote access to enterprise internal resources through a VPN. These cloud services are designed and well suited for road warriors. Road warriors are the users who are accessing the Internet 104 and enterprise internal services from outside the corporate physical network perimeter. These are the users 102 who are accessing the Internet 104 and Enterprise resources from home, airports, coffee shops, and other external unsecured hotspots.

The unified agent application 350 provides authenticated and encrypted tunnels from road warrior devices 300 and, in some use cases, it even needs to be enforceable so that end users cannot disable the unified agent application 350. The VPN, which is the remote access service, also needs authenticated and encrypted tunnel from road warrior user devices 300. Both of these solutions also need to provide feedback to the end user in the event that access was blocked due to security or compliance reasons. The following describes the architecture and design of the unified agent application 350, including an endpoint client architecture, backend changes, auto-update, and integration with the cloud-based system 100.

The unified agent application 350 includes logical components including view components 702, business processes and services 704, data 706, and cross-cutting functions 708. The view components 702 include User Interface (UI) components 710 and UI process components 712. The business processes and services 704 include a tray user process 714, a helper user process 716, a tunnel system service 718, a posture system service 720, and an updater system service 722. The data 706 includes encrypted data 724, configuration data 726, and logs 728. The cross-cutting functions 708 are across the view components 702, the business processes and services 704, and the data 706 and include security 730, logging 732, and statistics 734.

The unified agent application 350 has a useful goal of simplified provisioning of the proxy (for security through the cloud-based system 100 to the Internet 104) and the VPN (for access through the cloud-based system 100 to the enterprise private resources in the enterprise network 404). That is, the unified agent application 350 allows the use of the cloud-based system 100 as a proxy for Internet-bound communications. The unified agent application 350 further allows the use of the cloud-based system 100 as a tunnel for Intranet-bound communications to the enterprise private resources. With the unified agent application 350 setting up a local network at the user device 300, the unified agent application 350 can manage communications between the Internet and the intranet, i.e., two of the main categories of cloud services—proxy to the Internet and tunnel to the intranet. The unified agent application 350 further has objectives of simplified user enrollment in the proxy and tunnels.

In an embodiment, the unified agent application 350 is a native application. The common functionality is abstracted out and made into common libraries based on C or C++ so that it can be reused across different platforms (e.g., iOS, Android, etc.). Example functionality: Traffic forwarding tunnels, local proxy, authentication backend, logging, statistics, etc. The UI components 710 and UI process components 712 can be platform dependent. Also, the unified agent application 350 is designed and implementable such that other third-party VPN applications, if configured by the enterprise, can be used concurrently.

The app portal 632 enables the installation of the unified agent application 350 on the user device 300. For example, an admin may be able to push and install the unified agent application 350 to the user device 300 using remote-push mechanisms like GPO, MDMs, etc. Additionally, the user can download the unified agent application 350 if they have access to the installation file and install it on their own. The unified agent application 350 supports automatic updates without impacting the user's Internet experience. If a problem is encountered, then it should roll back to the previously successful state or fail open. The unified agent application 350 can have a security check to ensure that it is not tampered and updated from the right source with a hash match with a source hash when upgrading.

The user can log into the unified agent application 350. Once the user sends their User ID through the unified agent application 350 to the agent manager cloud 606, the security cloud 608, and/or the app portal 632, the app portal 632 can determine the company's authentication mechanism, such as through a lookup in the enterprise asset management 614, and validate password through the enterprise CA 618.

Through the unified agent application 350, a user can be authenticated to the proxy or the VPN through the security cloud 608. For authentication of the user to the proxy, using SAML, the user can log into the unified agent application 350 by using their user ID and transparent SAML authentication thereafter, including SAML certificate. The app portal 632 shall determine that an organization is using SAML for authentication through the enterprise CA 618 and redirect to the enterprise SAML IDP 616 to get SAML assertion and use it to authenticate the user.

For authentication of the user to the tunnel, using SAML, the user can log into the unified agent application 350 by just using their user ID and based on the user ID, the unified agent application 350 shall redirect the user for authentication to enterprise SAML IDP 616 and SAML assertion shall be sent. The VPN service shall validate SAML assertion; if the assertion is valid, then the unified agent application 350 shall collect hardware parameters like device serial number, model number, etc. and create CSR. The CSR shall be signed by the enterprise CA 618, and the certificate shall be pushed to the unified agent application 350. The unified agent application 350 shall install the certificate to KMS/keychain and save assertion.

After the user has been successfully authenticated, the user shall be enrolled in the proxy service, and the user's traffic forwarding profile shall be downloaded from unified agent application 350, including Secure Sockets Layer (SSL) certificates and exceptions. The unified agent application 350 shall indicate that the user is connected to cloud-based system 100, and app statistics shall be populated.

After the user has successfully authenticated (including transparent authentication), the user shall be enrolled with a VPN service, and the VPN broker info shall be downloaded by the unified agent application 350, and the VPN tunnel shall be established. The unified agent application 350 can support captive portal detection to fail open when users are behind a captive portal to allow connection to a captive portal.

The unified agent application 350 can forward internal enterprise traffic from the user device 300 to the VPN. The unified agent application 350 can recognize when a user goes to an internal app that is provisioned with the VPN service. The unified agent application 350 shall auto-enable a tunnel to the VPN service when the user tries connecting to an internal app. The proxy service can always be enforced, and the user is not able to remove it by switching off the tunnel or removing the unified agent application 350. Without the proxy solution enforced, the user is not able to access the Internet and would be prompted to restart the web security service, via the unified agent application 350.

The VPN is an on-demand service, unlike the proxy service that shall be enforceable by default so that the user can enable/disable the VPN at will without any password requirements. Once the user logs into the VPN service using a 'Connect,' the same button shall be labeled 'Disconnect,' and the user shall be able to disconnect the VPN service with a single click. Every time user disconnects with VPN service. The VPN service can be auto-disabled if the user puts their system to sleep mode or there is inactivity (no packets exchanged) after x minutes (x shall be configurable in the VPN settings).

The admin can turn off the proxy service with a single client from an admin UI for a user, all users, or some subset of users. This does not remove the unified agent application 350 from the user device 300. A user may be able to disable the proxy service, provided they have the authority and credentials. The unified agent application 350 can provide service-related notifications to the user. For example, the unified agent application 350 can provide notifications such as push alerts or the like as well as contain a notification area for a single place to show all notifications that are generated by the proxy service and the VPN service. This shall also include app notifications, including configuration updates, agent updates, etc. The user shall be able to clear notifications as well as filter notifications from this screen. This shall include a filter for VPN/Proxy, blocked, cautioned, quarantine actions.

Unified Agent Application—User Workflow

Again, the unified agent application 350 is executed on the user device 300. For authentication, the user enters a User ID in the unified agent application 350, such as userid@domain. Subsequently, the unified agent application 350 is configured to discover the services enabled—proxy service and VPN services based on userid@domain. The user authenticates with the presented services, i.e., proxy service, VPN services, and combinations thereof. The unified agent application 350 is auto-provisioned for the authenticated service by downloading the service-specific configuration. The unified agent application 350 performs the following during VPN enrollment—get the User/Device certificate signed by an Enterprise Intermediate Certificate. This Intermediate Certificate will be the same, which will be used for signing Assistants. The unified agent application 350 also will pin hardware signatures/fingerprints to the certificate and user, e.g., Storage Serial ID (Hard Drive Serial ID), CPU ID, Mother Board Serial ID, BIOS serial number, etc.

Unified Agent Application—Authentication and Enrollment Protocol

Figure 12:
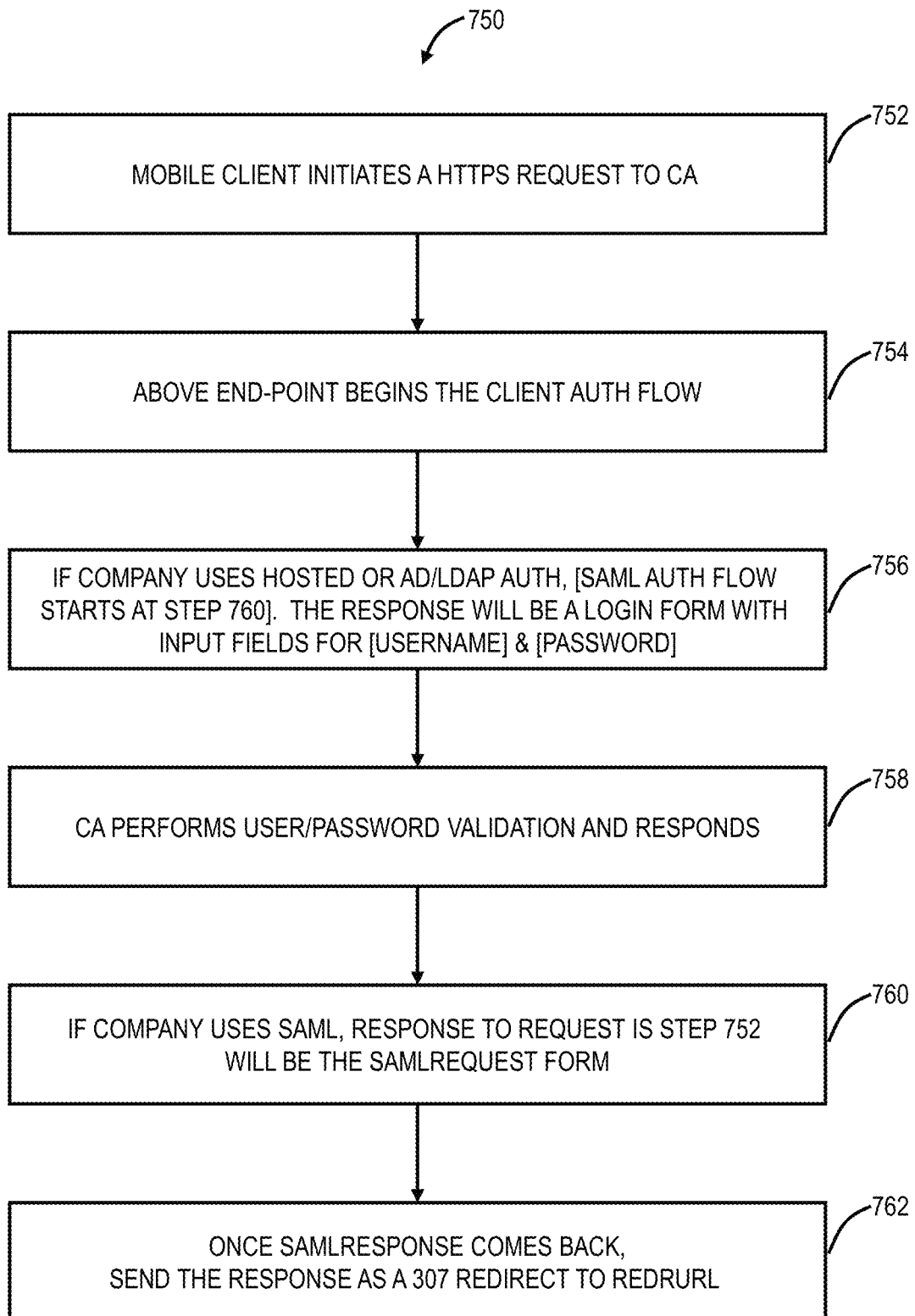
FIG. 12 is a flowchart of a proxy authentication process to the cloud-based system.

FIG. 12 is a flowchart of a proxy authentication process 750 to the cloud-based system 100. For authentication in the proxy service, conventionally, devices 300 can use proxy authentication to register to the cloud-based system 100. This is not truly reliable as it depends on location/location-authentication policy/VPN and other such factors to work correctly. To simplify this flow, the following new flow can be used with the unified agent application 350 for the process 750. First, the mobile client user device 300 initiates an HTTPS request to a CA (e.g., the enterprise CA 618) (step 752). For example, this can be as follows:

login.zscaler.net/
clstart?version=1&_domain=nestle.com&redrurl=<url-encoded-url-with-schema>

If the domain is invalid or if the redrurl is missing, CA will reset the connection.

The above endpoint begins the client auth flow (step 754). The provided domain is the company that requires the auth. The CA looks up the domain to find the company and their auth mechanism. If the company uses hosted or Active Directory (AD)/Lightweight Directory Access Protocol (LDAP) authentication [SAML auth flow starts at step 760], the response will be a login form with input fields for [username] & [password] (step 756). The form is submitted via POST to the CA at a below endpoint:

https://login.zscaler.net/clicred. The HTTP content may look like below
POST /clicred
Host: login.zscaler.net
Content-Length: xyz username=xyz@nestle.com&password=123456&redrurl=<url-encoded-posturl-with-schema>

Next, the CA performs user/password validation and responds with the message explained in step 762 (step 758). If the company uses SAML, the response to the request in step 752 will be the SAMLRequest form. The SAMLRequest form will auto-submit to the IDP. Once auth completes, the CA gets control back with the identity of the user. Once SAMLResponse comes back, send the response as a 307 redirect to redrurl with a below format Location: zsa://auth[?token=encrypted-cookie& . . . ] to be appended.
307 query params
token=(on success)
ecode=(on error)
emsg=(on error)
On error, send the same redrurl with below format
zsa://auth?ecode=<code>&emsg=<message>

Figure 13:
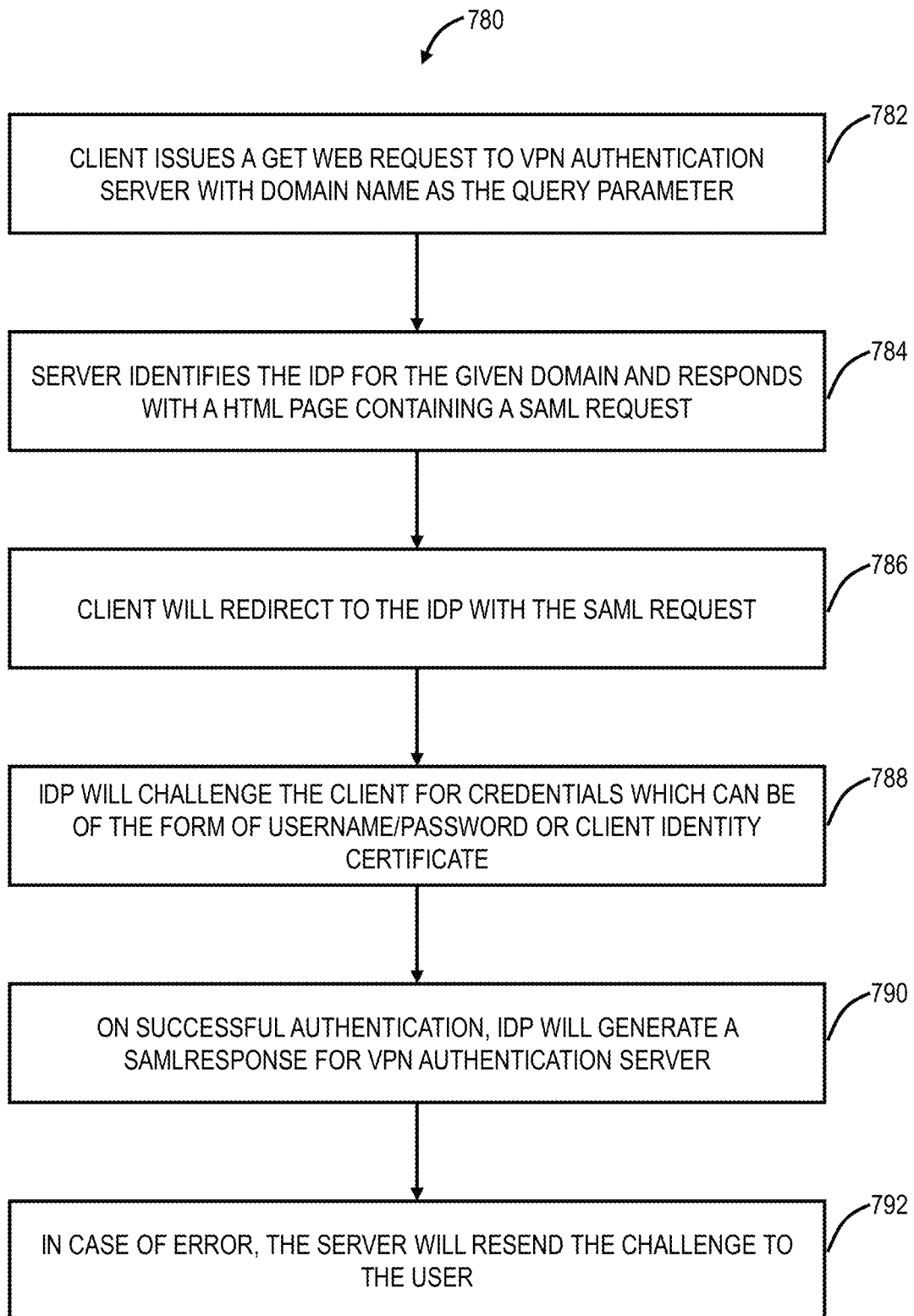
FIG. 13 is a flowchart of a VPN authentication process to the cloud-based system.

FIG. 13 is a flowchart of a VPN authentication process 780 to the cloud-based system 100. The client (user device 300) issues a GET web request to the VPN authentication server with the domain name as the query parameter (step 782), such as:

GET //<auth-server>?domain=mockcompany.com

The server identifies the IDP for the given domain and responds with a Hypertext Markup Language (HTML) page containing a SAML Request (step 784). The client will redirect to the IDP with the SAML Request (step 786). The IDP will challenge the client for credentials, which can be of the form of a username/password or client identity certificate (step 788). On successful authentication, IDP will generate a SAMLResponse for the VPN authentication server (step 790). The client will record the SAMLAssertion for future tunnel negotiation. In the case of error, the server will resend the challenge to the user (step 792).

Figure 14:
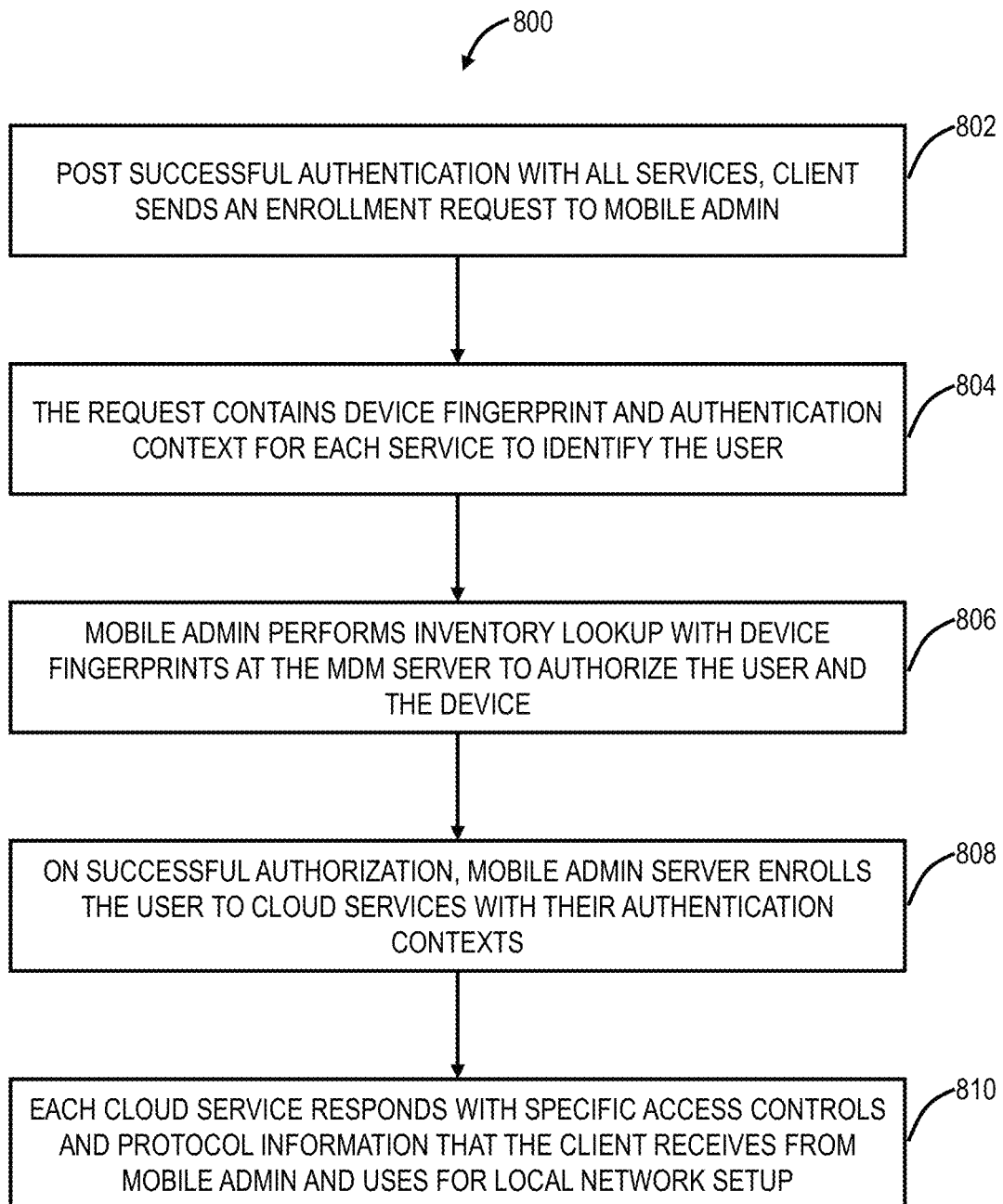
FIG. 14 is a flowchart of a device enrollment process for the client user device and the unified agent application.

FIG. 14 is a flowchart of a device enrollment process 800 for the client user device 300 and the unified agent application 350. Post successful authentication with all services, in this case, the proxy services and the VPN services, the client sends an enrollment request to mobile admin (Cloud Administrative Server CAS) (step 802). The request contains a device fingerprint and an authentication context for each service to identify the user (step 804). For example, the security cloud 608 can use cookies, and the VPN can use SAMLAssertion for the authentication context. The mobile admin (agent manager cloud 606) performs inventory lookup with device fingerprints at the MDM server to authorize the user and the user device 300 (step 806). On successful authorization, the mobile admin server enrolls the user to cloud services with their authentication contexts (step 808). Each cloud service responds with specific access controls and protocol information that the client receives from mobile admin and uses for local network setup (step 810).

Unified Agent Application—Traffic Interception and Splitting

Again, to protect Internet-bound traffic and simultaneously access enterprise-specific Intranet traffic, the user device 300 needs to connect through multiple applications. Again, it is not straightforward for users to configure these applications in different networks, and different VPN and proxy solutions arise compatibility issues when operating simultaneously. The unified agent application 350 is designed to solve all these issues. The unified agent application 350 handles both proxy (Internet-bound) traffic and Enterprise Intranet bound traffic. The unified agent application 350 provides secure access to Organizational internal resources when the user is outside of the enterprise network. For Internet-bound traffic, it will forward traffic to the enforcement node 150, and for intranet bound traffic, it will forward traffic to a VPN (Broker) or direct if the user is inside the organization network.

The unified agent application 350 is configured to intercept all traffic, specifically to intercept all Transmission Control Protocol (TCP) traffic and DNS traffic before it goes out through the external network interface in the user device 300. The unified agent application 350 can intercept other types of traffic as well, such as the User Datagram Protocol (UDP). The unified agent application 350 is configured to split traffic at the user device 300, i.e., based on a local network configured at the user device 300. Split traffic based upon port, protocol, and destination IP. The unified agent application 350 is configured to send VPN traffic direct for trusted networks (organization's internal network). The unified agent application 350 can also coexist with other VPN clients, i.e., it does not intercept the traffic targeted for those interfaces by specific routes.

Figure 15:
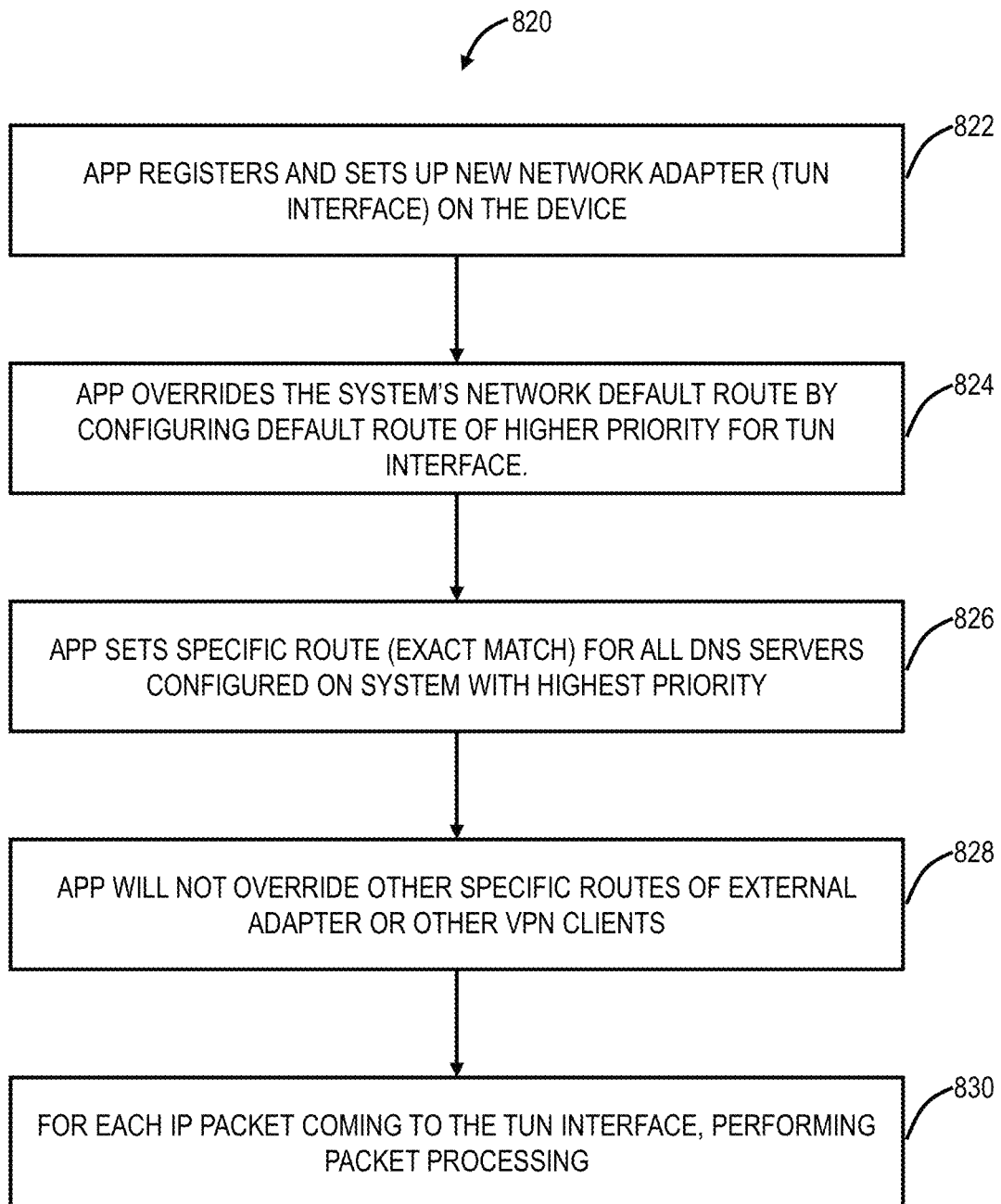
FIG. 15 is a flowchart of a traffic interception process implemented through the unified agent application.

Thus, the unified agent application 350 is configured to intercept all traffic at the IP layer for the device 300 or other VPN client's default route. Then, the unified agent application 350 is configured to split traffic. Based upon port, protocol, and destination IP as configured by the IT administrator FIG. 15 is a flowchart of a traffic interception process 820 implemented through the unified agent application 350. The unified agent application 350 registers and sets up a new Network Adapter (TUN interface) on the device (step 822). The unified agent application 350 overrides the device's network default route by configuring the default route of higher priority for the TUN interface (step 824). The unified agent application 350 sets a specific route (exact match) for all DNS servers configured on the user device 300 with the highest priority (step 826). The unified agent application 350 will not override other specific routes of an external adapter or other VPN clients (step 828).

For each IP packet coming to the TUN interface, packet processing is performed (step 830). The application does a <port, protocol, destination-IP> lookup on every IP packet and sends it on one of the dedicated tunnels based upon configured rules of packet transport.

Figure 16:
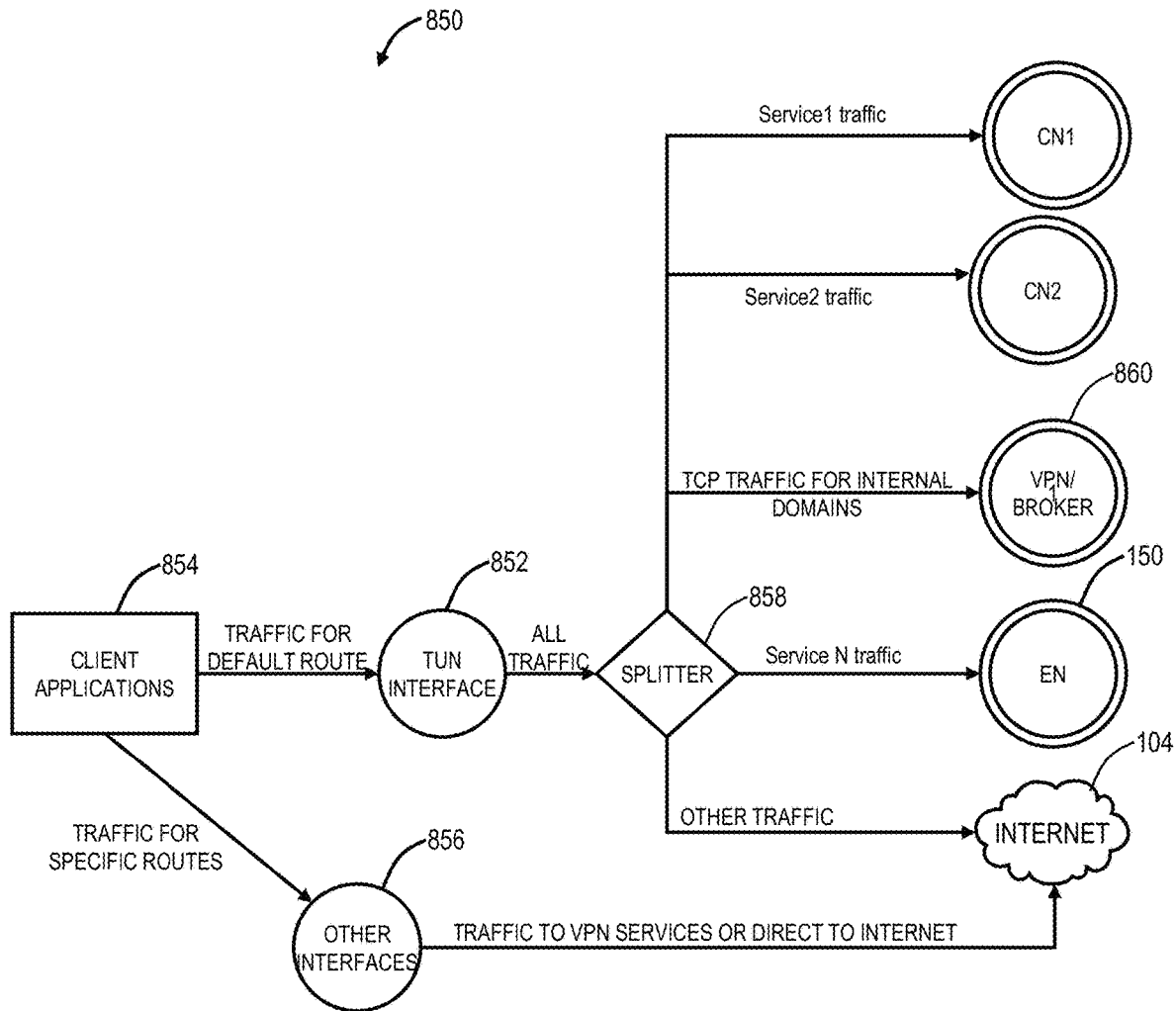
FIG. 16 is a flow diagram of traffic interception and splitting using the unified agent application.

FIG. 16 is a flow diagram of traffic interception and splitting 850 using the unified agent application 350. Again, the unified agent application 350 creates and operates a tunnel (TUN) interface 852 on the user device 300. The user device 300 includes one or more client applications 854, which can be any program or service executable on the user device 300, which requires access to the network interface on the user device 300. Traffic for the default route from the client applications 854 is sent to the TUN interface 852, but traffic for specific routes can be sent to other interfaces 856, separate from the TUN interface, for direct connectivity to the Internet 504, such as via VPN services or direct.

The TUN interface 852 splits 858 all traffic. TCP traffic for internal domains is sent to a VPN/broker server 860, TCP port 80/443 traffic is sent to the security cloud 608 for a proxy such as to the enforcement node 150. Finally, other traffic can be sent directly to the Internet 504. In this manner, the TUN interface 852 operates a local network at the user device 300.

Figure 17:
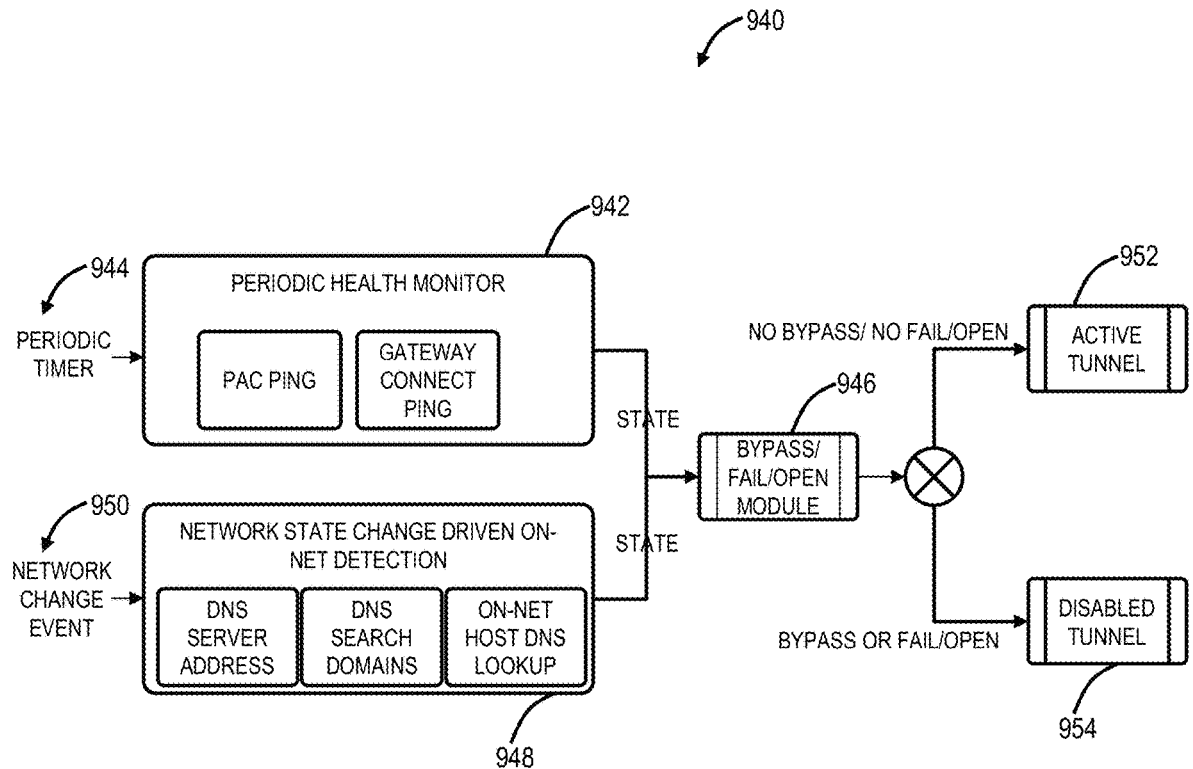
FIG. 17 is a flow diagram of tunnel forwarding rules by the unified agent application.

FIG. 17 is a flow diagram of tunnel forwarding rules 940 by the unified agent application 350. A periodic health monitor function 942 operates, based on a periodic timer 944, to check a PAC ping and a gateway connect ping to provide a state to a bypass fail/open module 946. A network state change function 948 is configured to detect a network change event 950 such as DNS server address, DNS search domains, on-net host DNS lookups, etc., and to provide a state to the bypass fail/open module 946. The bypass fail/open module 946 creates an active tunnel 952 or disabled tunnel 954 based on the states.

Service Driven Split Tunneling

Figure 18:
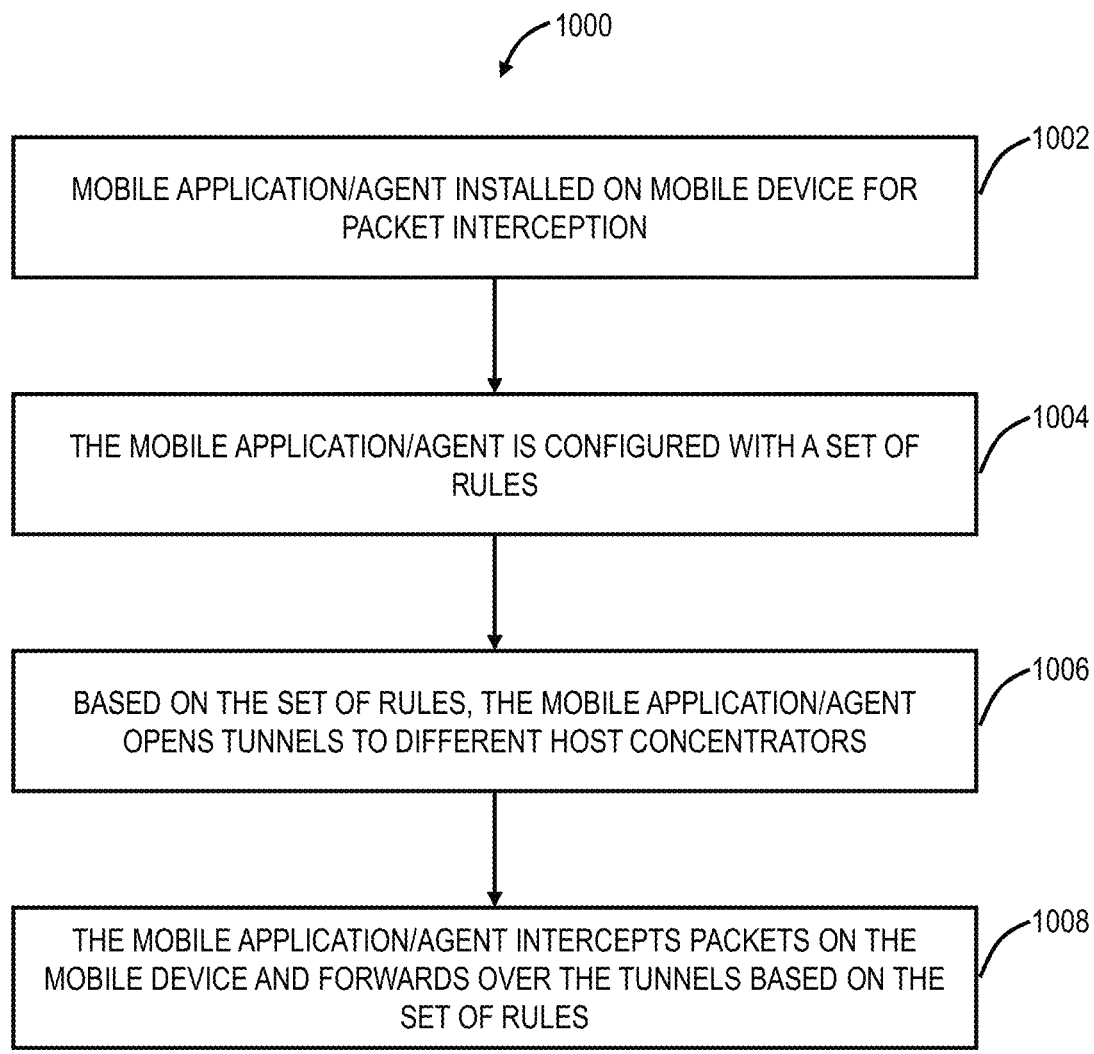
FIG. 18 is a flowchart of a service drive split tunneling process.

FIG. 18 is a flowchart of a service drive split tunneling process 1000. The service drive split tunneling process 1000 provides better scalability, security, and segmentation of traffic in mobile and cloud environments. The service-driven split tunneling process 1000 can include the traffic interception and splitting 850 using the unified agent application 350. Again, as illustrated in FIG. 18, the unified agent application 350 creates and operates a tunnel (TUN) interface 852 on the mobile user device 300. The mobile user device 300 includes one or more client applications 854, which can be any program or service executable on the user device 300, which requires access to the network interface on the user device 300. Traffic for the default route from the client applications 854 is sent to the TUN interface 852, but traffic for specific routes can be sent to other interfaces 856, separate from the TUN interface, for direct connectivity to the Internet 504, such as via VPN services or direct.

The service drive split tunneling process 1000 includes a mobile application/agent which is installed on a mobile device for packet interception (step 1002). For example, the mobile application/agent can be the unified agent application 350 on the mobile user device 300. The mobile application/agent can inject a default route on the mobile device pointing to its own interface to get all Layer 2 or Layer 3 packets.

The mobile application/agent is configured with a set of rules (step 1004). The set of rules can be learned at runtime (as the mobile application/agent operates, configured at application launch, configured during application operation, and a combination thereof. For example, the set of rules can be configured by IT administrators for specific users, groups, departments, etc. and sent to the mobile application/agent. Further, the set of rules can be learned based on the operation of the mobile application/agent.

The set of rules can be an array of tuples of included and excluded traffic. For example, the array of tuples can include the following format <exclude, destination_port, protocol, destination_IP address_subnet>
<include, destination_port, protocol, destination_IP address_subnet, transport type>

For example, a set of rules can include

<include, 443, TCP, 17.0.0.0/8, <TCP, gateway.zscaler. net:80

This rule would tunnel all TCP port 443 traffic destined to 17.0.0.0/8 subnet over a TCP transport on port 80 to host. com. Another rule can include <exclude, 53, UDP, *>

This rule does not tunnel any UDP port 53 (DNS) traffic, but rather sends it direct.

Based on the set of rules, the mobile application/agent opens tunnels to different host concentrators (step 1006). As described herein, the host concentrators can be the enforcement nodes 150, etc. The tunnel may or may not be authenticated depending upon the requirements. For the traffic that needs to go direct, the mobile application/agent proxies the connections locally through a RAW Socket or via a custom TCP/IP Stack embedded within the application itself.

The mobile application/agent intercepts packets on the user device and forwards over the tunnels based on the set of rules (step 1008). Through this granular splitting of network traffic, IT administrators will have better control of the network traffic in terms of security and scalability. For instance, an IT admin can now control that only special traffic such as Session Initiation Protocol (SIP) should go outside the tunnel, and rest should go to some security gateway or vice versa. Any number of complex rules is hence possible.

End users will also have significant performance benefits over traditional SSL/IPSec VPNs where traffic of different needs compete with each other. The service drive split tunneling process 1000 allows function-driven security and on-demand scalability for different services. So, File Transfer Protocol (FTP) traffic goes to a secure FTP proxy, Web traffic (TCP, port 80 traffic) goes to a Web proxy, HTTPS (TCP, port 443) goes to an SSL acceleration proxy, SIP traffic goes to SIP traffic processing concentrator and so on.

Hybrid Architecture for Security Processing

Again, the present disclosure relates to mobile devices, which are one subset of the user device 300, referred to herein as a mobile device 300. The present disclosure relates to systems and methods for enforcing security policies on mobile devices 300 in a hybrid architecture. Here, the hybrid architecture means security processing occurs both via the application 350 and the cloud-based system 100 in a unified and coordinated manner. The hybrid architecture utilizes the application 350 first to generate a local decision about whether to BLOCK/ALLOW connections based on a local map. If a connection is not in the local map, the application 350 forwards a request to the cloud-based system 100 to generate a decision. In this manner, the hybrid architecture decreased bandwidth consumption between the mobile device 300 and the cloud-based system 100 by utilizing the previous BLOCK information. The hybrid architecture decreases processor utilization on the mobile device 300 by relying on a cloud service through the cloud-based system 100 for calculating request signatures, detecting malware, detecting privacy information leakage, etc. That is, the application 350 makes simple decisions—ALLOW or BLOCK, and the cloud-based system 100 does advanced processing where needed, sandbox, advanced threat detection, signature-based detection, DLP dictionary analysis, etc.

This approach also decreases the average latency, specifically for blocked requests. A user 102 gets an immediate block as opposed to a delay based on an exchange with the cloud service. Finally, this hybrid architecture approach increases the coverage of security policies/signature-based checks on mobile devices 300, because the cloud based system 100 has significant processing capability relative to the mobile device 300. Here, the application 350 is coordinating with the cloud service. The actual policies are configured in a cloud portal of the cloud-based system 100 and immediately promulgated to corresponding mobile devices 300. The application 350 serves as a gatekeeper to process simple requests, namely BLOCK/ALLOW connections, based on entries in a local map. The cloud-based system 100 processes complex requests, where entries are not in the local map or where other security policies require, such as where data requires DLP analysis, etc. Again, mobile devices 300 have limited battery, storage, processing capabilities. The application 350 is lightweight and operates considering these limitations.

Figure 19:
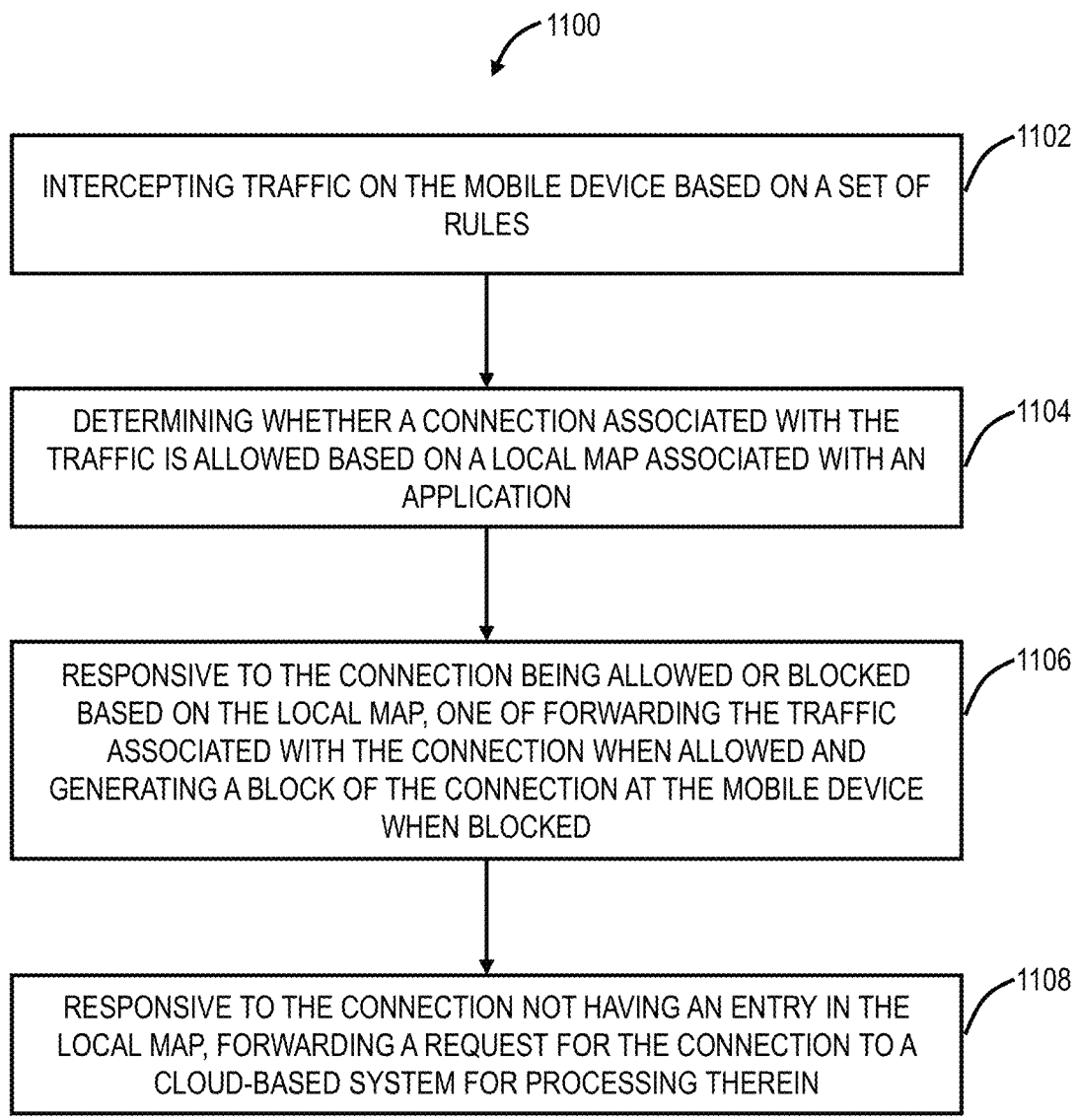
FIG. 19 is a flowchart of a process for security processing in a hybrid architecture.

FIG. 19 is a flowchart of a process 1100 for security processing in a hybrid architecture. The process 1100 is described with reference to steps implemented at a mobile device 300, and those skilled in the art will recognize functions are also performed in the cloud-based system 100. The process 1100 contemplates implementation as a method, via the mobile device 300, and as computer-executable instructions stored in a non-transitory computer-readable medium storing.

The process 1100 includes intercepting traffic on the mobile device 300 based on a set of rules (step 1102); determining whether a connection associated with the traffic is allowed based on a local map associated with an application 350 (step 1104); responsive to the connection being allowed or blocked based on the local map, one of forwarding the traffic associated with the connection when allowed and generating a block of the connection at the mobile device 300 when blocked (step 1106); and, responsive to the connection not having an entry in the local map, forwarding a request for the connection to a cloud-based system 100 for processing therein (step 1108). The cloud-based system 100 is configured to allow or block the connection based on the connection not having an entry in the local map.

There can be multiple different local maps, such as a firewall map, a domain map, and an HTTP request map. The firewall map can be the first map to consult for every connection. It has rules based on destination IP address, protocol, and port. The domain map, after the firewall map, can be consulted for HTTP and HTTPS connections. For HTTP, the application 350 can use the domain in the HTTP host header, and for HTTPS, the application 350 can use Server Name Indication (SNI). After the domain map, the HTTP domain map is consulted for HTTP requests, this map will have different set of rule categories such as: a) HTTP request type: Match HTTP domain (optional) and request type like GET/POST/HEAD, etc., b) HTTP header: Match HTTP request header key:value(optional) pairs and domain (optional), c) HTTP Version: Match Http version and domain (optional), d) Whole HTTP payload: Match HTTP request payload SHA256 hash by excluding specific request headers.

The process 1100 can further include receiving an update from the cloud-based system 100 based on the forwarding the request to the cloud-based system 100; and updating the local map based on the update. Here, the application 350 is configured to cache previous decisions that were made by the cloud-based system 100. The process 1100 can further include receiving periodic updates from the cloud-based system 100; and updating the local map based on the periodic updates. Here, the periodic updates can be based on new security policies for a tenant of the user, detections of connections as malware or other malicious content for blocking, etc. The periodic updates can be based on monitoring in the cloud-based system and on policy of a tenant associated with a user of the mobile device.

The process 1100 can also include timing out entries in the local map and removing timed out entries. Here, the local map can have entries purged over time. This is not an issue as the fallback for any connection not found in the local map is processing in the cloud-based system 100. Thus, the local map does not need to have every possible connection entered in the local map; only ones that are used regularly. Each object within the map can have their own timeout determined based on the nature of block, e.g., for a firewall block, it can be more, and, for HTTP request payload block, it could be less.

In an embodiment, the traffic includes Hypertext Transfer Protocol (HTTP) and HTTP Secure (HTTPS) requests. The application 350 can intercept the HTTP/HTTPS requests on the mobile device 300 by means of route based rules. The routes added by the application 350 redirect all the traffic to itself via a virtual tun/tap adapter. For each incoming HTTP/HTTPS request, the application 350 consults the local map indicating if the connection needs to be blocked. In the case of BLOCK, it generates a local BLOCK response and sends it to the client application that generated the traffic. If the entry for this particular connection does not exist in the local map, the request is forwarded to the cloud service. Every BLOCK response from the cloud service can be saved locally in the local map for future consultation. There are several types of maps maintained on the client based on the type of BLOCK received from the cloud service. The process 1100 also contemplates non-HTTP/HTTPS traffic as well.

For a firewall map, if the request is forwarded to the cloud, a cloud firewall can provide the BLOCK and the decision can be provided to the local firewall map for future traffic. The updates between the application 350 and the cloud-based system 100 can be based on a tunnel. For example, a tunnel used between the mobile device 300, the application 350, and an enforcement node 150 can include information exchanged related to BLOCKs and the associated reasons. For example, DLP_VIOLATION, PROTOCOL_ACCESS_DENIED, etc. The local map can be populated based on the tunnel data.

Adaptive Multipath Traffic Forwarding

Again, the present disclosure describes adaptive multipath traffic forwarding mechanisms for better performance and resource utilization in mobile and cloud environments. The present disclosure contemplates operation with the user device 300 as a mobile device executing the application 350 and with connectivity to the cloud-based system 100.

Figure 20:
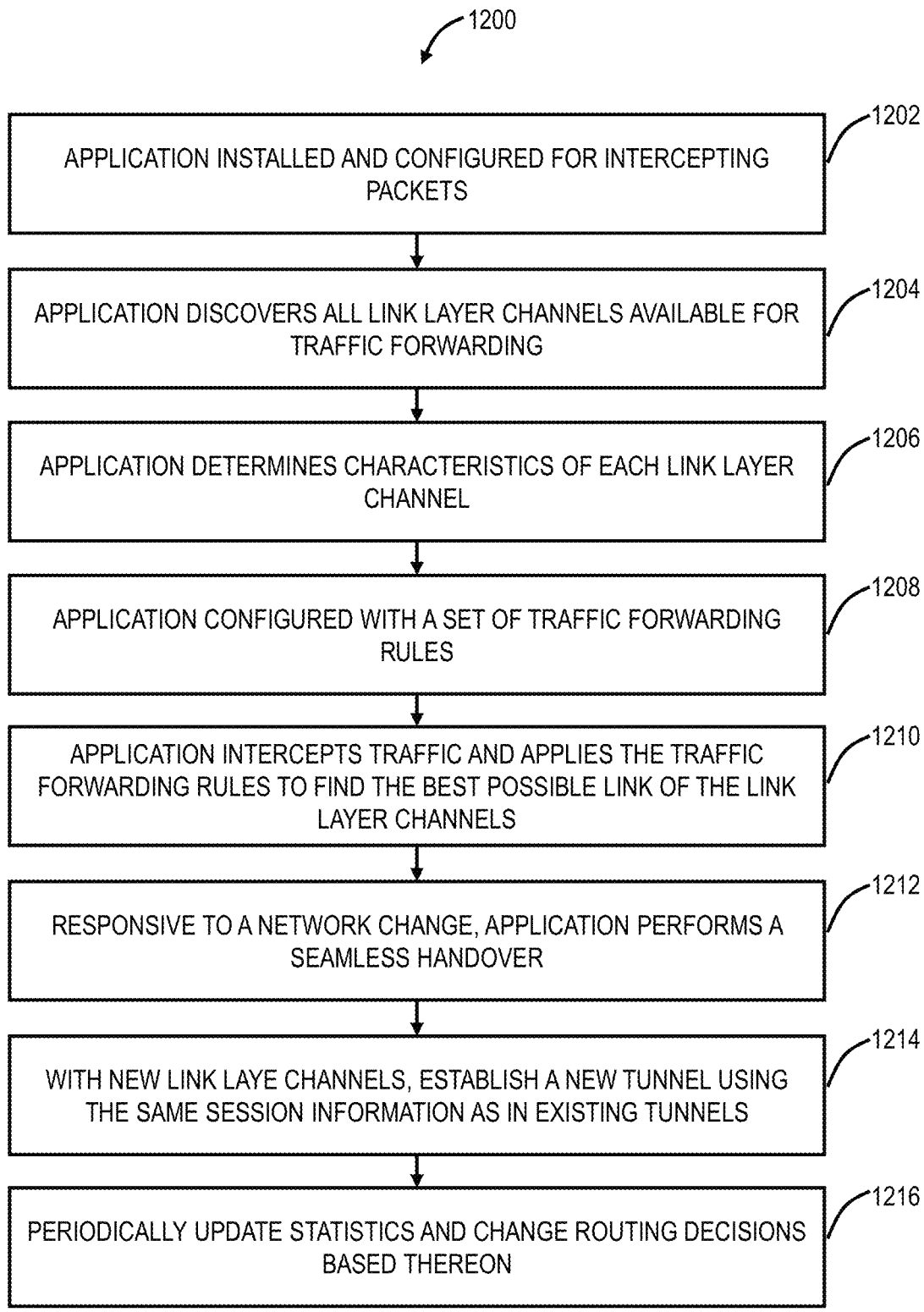
FIG. 20 is a flowchart of a process for adaptive multipath traffic forwarding.

FIG. 20 is a flowchart of a process 1200 for adaptive multipath traffic forwarding. The process 1200 is described with reference to steps implemented at a mobile device 300 that communicates with the cloud-based system 100. The process 1200 contemplates implementation as a method, via the mobile device 300, and as computer-executable instructions stored in a non-transitory computer-readable medium storing.

The steps in the process 1200 include installing the application 350 on the mobile device 300 and configuring the application for intercepting packets (step 1202). As described herein, the application 350 includes a packet interception module that can either install a virtual interface or can apply a network filter to get all Layer 2 and Layer 3 packets. The application 350 is configured to discover all link-layer channels available for traffic forwarding (step 1204). The link layer is the lowest layer in a networking architecture. The link layer is the group of techniques and communications protocols confined to the link that a host is physically connected to. The link is the physical and logical network component used to interconnect the mobile device 300 in the network and a link protocol is a suite of processes and standards that operate only between adjacent network nodes of a network segment. The link layer is sometimes described as a combination of the data link layer (layer 2) and the physical layer (layer 1) in the OSI model. For a practical embodiment of a mobile device 300, the link-layer channels can include Wi-Fi (IEEE 802.11 and variants thereof), Bluetooth, Ethernet, wireless cellular channels, etc. For example, the wireless cellular channels can include GSM, EDGE, LTE, 5G, etc. The application 350 determines every link-layer channel's characteristics (step 1206). This step can include measuring the bandwidth and throughput by doing some example data exchange with the secure gateway (e.g., the enforcement node 150), i.e., a speed test.

The application is configured with a set of traffic forwarding rules (step 1208). Here, the set of traffic forwarding rules can be configured by an IT administrator, and may include a default set of rules. The rules can be a list of tuples of IP addresses or domains with assigned priorities such as HIGH, DEFAULT, LOW and the destination secure gateway (e.g., the enforcement node 150). For instance: <10.0.0.0/8, HIGH, gateway.zscaler.net>, <Youtube.com, LOW, gateway.zscaler.net>, <*, DEFAULT, gateway.zscaler.net> translates to the traffic to Intranet should be given high priority over youtube.com traffic and all the other traffic has default priority and can be tunneled through any available channel to a gateway, gateway.zscaler.net, such as an enforcement node 150 in the cloud-based system 100. The IT admin may also choose to tunnel different gateways depending upon the needs.

The steps 1202-1208 include configuration steps. Subsequent to the configuration steps, the application intercepts the traffic and applies the rules to find the best possible link of the link-layer channels for forwarding IP packets (step 1210). Note, each of the link-layer channels is configured with a secure tunnel from the mobile device 300 to the cloud-based system 100, and the application 350 is configured to route packets to the appropriate tunnel in a given link-layer channel, such as using the virtual interface or network filter.

Responsive to a network change, the application 350 can do a seamless handover of all the IP packets flowing one tunnel to the other tunnel without breaking any end user network connections (step 1212). When new link layers channel come up, the application 350 can establish a new tunnel to the secure gateway using the same session information as used in other tunnels (step 1214). Typically, a mobile device 300 will remain connected to the wireless cellular channels, but may come and go into Wi-Fi networks. Here, when Wi-Fi is connected, the application 350 can establish new tunnels on those corresponding link-layer channels.

The application 350 can periodically update its statistics on the link level channel capacity to dynamically make routing decisions as the throughput capacities and usage for a particular link increase or decrease (step 1216). For instance, based on user's subscription plan, the Wi-Fi speed might reduce after a prolonged period of usage, beyond which data transfer over cellular channel will become more efficient than Wi-Fi.

Advantages of Adaptive Multipath Traffic Forwarding

The present disclosure includes a performance-driven tunneling solution for mobile devices that has several advantages as follows.

First, there is increased throughput to the sum of all available link-level channels. Conventionally, SSL or IPSec VPNs use only a single channel to forward all user traffic which greatly limits the possible throughput. The solution uses multiple available paths for traffic forwarding to secure web gateways (such as the enforcement nodes 150), which can be on-premise or in the cloud-based system 100. Using multiple channels to forward user traffic allows for maximum resource usage as all available paths are utilized, thus providing the best possible user experience.

Second, this approach supports prioritized network traffic and for preemption. The tunneling approach provides a way for IT administrator to prioritize access to work-related mission-critical applications and resources instead of, for example, media traffic that is not important for work. Thus, an IT administrator might choose to give priority to Office365 applications instead of streaming media to end users for better utilization of network traffic. The solution also provides for preemption allowing higher priority network traffic to be tunneled before the lower priority network traffic, thus allowing support for granular control on end user traffic shaping.

Third, the tunneling solution supports fault tolerance. Using multiple paths for traffic forwarding allows for better control for user's network traffic in case of network failures on one or more available channels. Also, as mobile devices hop from one network to another, user's traffic is not impacted and can continue over available active channels. Hence, links may be added or dropped as the user moves in or out of coverage without disrupting the existing and new end-to-end TCP/UDP connections. The session information is shared across all available tunnels thus allowing fast renegotiations with the secure gateway.

Finally, the tunneling solution supports compatibility with existing networking devices. The proposed solution is compatible with existing middleboxes such as NATs, Proxies and Network malware scanning system and does not need any upgrades to networking infrastructure which is a significant problem in implementing multipath TCP as it creates cross path data fragmentation causing firewalls and malware scanners to abort mTCP connections immediately.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium storing computer-executable instructions, and in response to execution of an application on a mobile device, the computer-executable instructions cause the application on the mobile device to perform the steps of:
    establishing, via the application, a plurality of tunnels to a gateway, wherein each of the plurality of tunnels is on one of a plurality of link layer channels at the mobile device;
    intercepting, via the application, network traffic at an Internet Protocol (IP) layer of the mobile device;
    determining, via the application, characteristics including bandwidth of each of the plurality of link layer channels;
    forwarding, via the application, the network traffic through one of the plurality of tunnels based on a set of traffic forwarding rules and the characteristics including the bandwidth of each of the plurality of link layer channels; and
    responsive to detecting a network change for the mobile device, establishing one or more new tunnels to the gateway based on new link layer channels discovered for newly detected networks, managing the plurality of new and existing tunnels, and continuing the forwarding based on the managing.

2. The non-transitory computer-readable medium of claim 1, wherein the steps further include
    configuring the application with the set of traffic forwarding rules.

3. The non-transitory computer-readable medium of claim 1, wherein the set of traffic forwarding rules include a tuple of address or domain, assigned priority, and address of the gateway.

4. The non-transitory computer-readable medium of claim 1, wherein each of the plurality of tunnels is a lightweight tunnel that is Hypertext Transfer Protocol (HTTP)-based.

5. The non-transitory computer-readable medium of claim 1, wherein the intercepting is via one of a virtual interface and a network filter.

6. The non-transitory computer-readable medium of claim 1, wherein the steps further include
    discovering the plurality of link layer channels via the application executing on the mobile device, wherein the plurality of link channels include a wireless cellular channel and a Wi-Fi channel, and wherein new tunnels are established on corresponding Wi-Fi link layer channels.

7. The non-transitory computer-readable medium of claim 1, wherein the managing further includes steps of
    adding or removing tunnels based the network change, wherein added tunnels are established by the application using the same session information as used in existing tunnels.

8. The non-transitory computer-readable medium of claim 1, wherein the forwarding includes forwarding traffic to all of the plurality of tunnels concurrently.

9. A method implemented by an application executing on a mobile device, the method comprising:
- establishing, via the application, a plurality of tunnels to a gateway, wherein each of the plurality of tunnels is on one of a plurality of link layer channels at the mobile device;
- intercepting, via the application, network traffic at an Internet Protocol (IP) layer of the mobile device;
- determining, via the application, characteristics including bandwidth of each of the plurality of link layer channels;
- forwarding, via the application, the network traffic through one of the plurality of tunnels based on a set of traffic forwarding rules and the characteristics including the bandwidth of each of the plurality of link layer channels; and
- responsive to detecting a network change for the mobile device, establishing one or more new tunnels to the gateway based on new link layer channels discovered for newly detected networks, managing the plurality of new and existing tunnels, and continuing the forwarding based on the managing.

10. The method of claim 9, further comprising
configuring the application with the set of traffic forwarding rules.

11. The method of claim 9, wherein the set of traffic forwarding rules include a tuple of address or domain, assigned priority, and address of the gateway.

12. The method of claim 9, wherein each of the plurality of tunnels is a lightweight tunnel that is Hypertext Transfer Protocol (HTTP)-based.

13. The method of claim 9, wherein the intercepting is via one of a virtual interface and a network filter.

14. The method of claim 9, further comprising
discovering the plurality of link layer channels via the application executing on the mobile device, wherein the plurality of link layer channels include a wireless cellular channel and a Wi-Fi channel, and wherein new tunnels are established on corresponding Wi-Fi link layer channels.

15. The method of claim 9, wherein the managing further comprises
adding or removing tunnels based the network change, wherein added tunnels are established by the application using the same session information as used in existing tunnels.

16. The method of claim 9, wherein the forwarding includes forwarding traffic to all of the plurality of tunnels concurrently.

17. A mobile device configured to execute an application for service discovery and connectivity, the mobile device comprising:
- a network interface, a data store, and a processor communicatively coupled to one another; and
- memory storing computer-executable instructions, and in response to execution by the processor, the computer-executable instructions cause the application executing on the mobile device to
  - establish, via the application, a plurality of tunnels to a gateway, wherein each of the plurality of tunnels is on one of a plurality of link layer channels at the mobile device;
  - intercept, via the application, network traffic at an Internet Protocol (IP) layer of the mobile device;
  - determine, via the application, characteristics including bandwidth of each of the plurality of link layer channels;
  - forward, via the application, the network traffic through one of the plurality of tunnels based on a set of traffic forwarding rules and the characteristics including the bandwidth of each of the plurality of link layer channels; and
  - responsive to detecting a network change for the mobile device, establish one or more new tunnels to the gateway based on new link layer channels discovered for newly detected networks, manage the plurality of new and existing tunnels, and continue the forwarding based on the managing.

\* \* \* \* \*